(12) United States Patent
Ahn et al.

(10) Patent No.: US 10,456,738 B2
(45) Date of Patent: Oct. 29, 2019

(54) METHOD AND APPARATUS FOR SEPARATING ONE OR MORE COMPONENTS FROM A COMPOSITION

(71) Applicant: Dow Corning Corporation, Midland, MI (US)

(72) Inventors: Dongchan Ahn, Midland, MI (US);
Aaron J. Greiner, Midland, MI (US);
James S. Hrabal, St. Louis, MI (US);
Alexandra N. Lichtor, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 223 days.

(21) Appl. No.: 15/800,747

(22) Filed: Nov. 1, 2017

(65) Prior Publication Data

US 2018/0078894 A1 Mar. 22, 2018

Related U.S. Application Data

(63) Continuation of application No. 14/873,620, filed on Oct. 2, 2015, now Pat. No. 9,833,737, which is a continuation of application No. 14/413,231, filed as application No. PCT/US2013/061625 on Sep. 25, 2013, now Pat. No. 9,731,245.

(60) Provisional application No. 61/778,952, filed on Mar. 13, 2013, provisional application No. 61/705,663, filed on Sep. 26, 2012.

(51) Int. Cl.
| | |
|---|---|
| *B01D 53/14* | (2006.01) |
| *B01D 53/22* | (2006.01) |
| *B01D 53/26* | (2006.01) |
| *B01D 71/70* | (2006.01) |
| *B01D 19/00* | (2006.01) |
| *B01D 53/18* | (2006.01) |
| *B01D 69/04* | (2006.01) |
| *B01D 69/06* | (2006.01) |
| *B01D 69/10* | (2006.01) |
| *B01D 63/02* | (2006.01) |

(52) U.S. Cl.
CPC ..... *B01D 53/1493* (2013.01); *B01D 19/0073* (2013.01); *B01D 53/1425* (2013.01); *B01D 53/1443* (2013.01); *B01D 53/1475* (2013.01); *B01D 53/18* (2013.01); *B01D 53/228* (2013.01); *B01D 53/229* (2013.01); *B01D 53/263* (2013.01); *B01D 53/268* (2013.01); *B01D 69/04* (2013.01); *B01D 69/06* (2013.01); *B01D 69/10* (2013.01); *B01D 71/70* (2013.01); *B01D 63/02* (2013.01); *B01D 2252/204* (2013.01); *B01D 2252/205* (2013.01); *B01D 2256/10* (2013.01); *B01D 2256/245* (2013.01); *B01D 2257/102* (2013.01); *B01D 2257/104* (2013.01); *B01D 2257/504* (2013.01); *B01D 2257/80* (2013.01); *B01D 2325/027* (2013.01); *Y02C 10/06* (2013.01); *Y02C 10/10* (2013.01)

(58) Field of Classification Search
CPC ............ B01D 19/0073; B01D 53/1425; B01D 53/1443; B01D 53/1475; B01D 53/1493; B01D 53/228; B01D 53/229; B01D 53/263; B01D 53/268; B01D 2252/205; B01D 2256/245; B01D 2257/504; B01D 2257/80; B01D 2325/027
See application file for complete search history.

(56) References Cited

U.S. PATENT DOCUMENTS

| | | | |
|---|---|---|---|
| 3,339,341 A | 9/1967 | Maxwell et al. |
| 3,466,508 A | 9/1969 | Booe |
| 3,491,269 A | 1/1970 | Booe |

(Continued)

FOREIGN PATENT DOCUMENTS

| | | | |
|---|---|---|---|
| DE | 4101045 A1 | 8/1991 |
| DE | 19812960 C1 | 11/1999 |

(Continued)

OTHER PUBLICATIONS

English language machine translation for DE 102004053167 A1. Retrieved from http://translationportal.epo.org on Nov. 23, 2016. (Year: 2016).*

(Continued)

*Primary Examiner* — Jason M Greene

(57) ABSTRACT

The present invention relates to methods of separating one or more components from a feed composition, methods of desorbing one or more components from an absorbent fluid, as well as systems and apparatus that can carry out the methods. In one embodiment, the present invention provides a method of separating one or more components from a feed composition including contacting at least some of a first component of a feed composition including the first component with an absorbent fluid, to provide a contacted composition and a used absorbent fluid including at least some of the first component contacted with the absorbent fluid. In some embodiments the absorbent fluid can be an organosilicon fluid including an organosilicon including at least one of a hydroxy group, an ether group, an acrylate group, a methacrylate group, an acrylamide group, a methacrylamide group, and a polyether group. In some embodiments, during the contacting the feed composition can be contacted to a first side of a membrane while the absorbent fluid is contacted to a second side of the membrane. In some embodiments, the membrane can be a silicone membrane.

18 Claims, No Drawings

(56) References Cited

U.S. PATENT DOCUMENTS

| | | | |
|---|---|---|---|
| 3,668,183 | A | 6/1972 | Hoy |
| 4,115,081 | A | 9/1978 | Ohno et al. |
| 4,122,029 | A | 10/1978 | Gee et al. |
| 4,260,780 | A | 4/1981 | West |
| 4,276,424 | A | 6/1981 | Peterson, Jr. et al. |
| 4,314,956 | A | 2/1982 | Baney et al. |
| 4,324,901 | A | 4/1982 | West et al. |
| 4,466,202 | A | 8/1984 | Merten |
| 4,510,094 | A | 4/1985 | Drahnak |
| 4,530,879 | A | 7/1985 | Drahnak |
| 4,718,921 | A | 1/1988 | Makino et al. |
| 4,766,165 | A | 8/1988 | Kress et al. |
| 4,871,379 | A | 10/1989 | Edwards et al. |
| 5,002,590 | A | 3/1991 | Friesen et al. |
| 5,017,654 | A | 5/1991 | Togashi et al. |
| 5,034,126 | A | 7/1991 | Reddy et al. |
| 5,387,417 | A | 2/1995 | Rentsch |
| 5,496,961 | A | 3/1996 | Dauth et al. |
| 5,498,339 | A | 3/1996 | Creusen et al. |
| 5,811,487 | A | 9/1998 | Schulz, Jr. et al. |
| 5,832,712 | A * | 11/1998 | Ronning ............ B01D 53/1475 60/783 |
| 6,117,963 | A * | 9/2000 | Boinowitz ............ C08G 77/46 521/112 |
| 6,165,253 | A | 12/2000 | Sirkar |
| 6,797,212 | B2 | 9/2004 | Montoya |
| 7,858,197 | B2 | 12/2010 | Ahn et al. |
| 8,030,509 | B2 | 10/2011 | Perry et al. |
| 8,500,892 | B2 | 8/2013 | Seiler et al. |
| 9,731,245 | B2 * | 8/2017 | Ahn .................. B01D 53/1475 |
| 9,833,737 | B2 * | 12/2017 | Ahn .................. B01D 53/1475 |
| 2002/0165505 | A1 | 11/2002 | Gee et al. |
| 2006/0058451 | A1 | 3/2006 | Gommans et al. |
| 2007/0286783 | A1 | 12/2007 | Carrette et al. |
| 2010/0319370 | A1 | 12/2010 | Kozubal et al. |
| 2011/0052458 | A1 | 3/2011 | Hu |
| 2011/0308390 | A1 | 11/2011 | Perry et al. |
| 2011/0291046 | A1 | 12/2011 | Patrone |
| 2012/0017762 | A1 * | 1/2012 | Seiler ................ B01D 53/1493 95/203 |
| 2012/0171095 | A1 * | 7/2012 | O'Brien ............ B01D 53/1475 423/228 |
| 2012/0187046 | A1 * | 7/2012 | Boday .................. B01D 53/228 210/651 |
| 2012/0286783 | A1 | 11/2012 | Constable et al. |
| 2014/0150287 | A1 | 6/2014 | Ahn et al. |
| 2015/0190747 | A1 | 7/2015 | Ahn et al. |
| 2016/0023158 | A1 | 1/2016 | Ahn et al. |

FOREIGN PATENT DOCUMENTS

| | | | |
|---|---|---|---|
| DE | 102004053167 A1 * | 5/2006 | ............ B01D 53/04 |
| DE | 102004053167 A1 | 5/2006 | |
| EP | 0430331 A1 | 6/1991 | |
| EP | 577276 B1 | 8/1997 | |
| FR | 2623101 A1 | 5/1989 | |
| JP | 55121337 A | 9/1980 | |
| JP | 01-099631 A | 4/1989 | |
| JP | 2000037612 A | 2/2000 | |
| JP | 2001-294512 A | 10/2001 | |
| PL | 149837 B2 | 3/1990 | |
| SU | 975041 A1 | 11/1982 | |
| WO | WO-02070112 A2 | 9/2002 | |
| WO | WO-03101412 A2 | 12/2003 | |
| WO | WO-2006073695 A1 | 7/2006 | |
| WO | WO-2010126694 A1 | 11/2010 | |
| WO | WO-2011150081 A2 | 12/2011 | |
| WO | WO-2013010076 A1 | 1/2013 | |
| WO | WO-2014052419 A1 | 4/2014 | |
| WO | WO-2014052423 A1 | 4/2014 | |

OTHER PUBLICATIONS

U.S. Appl. No. 14/131,565, filed Jan. 8, 2014, Method of Drying Material by Membrane Dehumidified Air.

U.S. Appl. No. 14/413,231 now U.S. Pat. No. 9,731,245, filed Jan. 7, 2015, Method of Separating a Gas Using at Least One Membrane in Contact With an Organosilicon Fluid.

U.S. Appl. No. 14/873,620 now U.S. Pat. No. 9,833,737, filed Oct. 2, 2015, Method and Apparatus for Separating One or More Components From a Composition.

"U.S. Appl. No. 14/413,231, Final Office Action dated Aug. 12, 2016", 10 pgs.

"U.S. Appl. No. 14/413,231, Non Final Office Action dated Jan. 29, 2016", 11 pgs.

"U.S. Appl. No. 14/413,231, Preliminary Amendment dated Jan. 6, 2015", 6 pgs.

"U.S. Appl. No. 14/413,231, Response filed Jul. 27, 2016 to Non Final Office Action dated Jan. 29, 2016", 11 pgs.

"U.S. Appl. No. 14/413,231, Supplemental Response filed Jul. 29, 2016", 11 pgs.

U.S. Appl. No. 14/873,620, filed Oct. 2, 2015, Method and Apparatus for Separating One or More Components From a Composition.

"U.S. Appl. No. 14/873,620, Final Office Action dated Apr. 21, 2017", 21 pgs.

"U.S. Appl. No. 14/873,620, Non Final Office Action dated Dec. 1, 2016", 16 pgs.

"U.S. Appl. No. 14/873,620, Notice of Allowance dated Aug. 7, 2017", 8 pgs.

"U.S. Appl. No. 14/873,620, Response filed Apr. 3, 2017 to Non Final Office Action dated Dec. 1, 2016", 11 pgs.

"U.S. Appl. No. 14/873,620, Response filed Jul. 20, 2017 to Final Office Action dated Apr. 21, 2017", 9 pgs.

"Corn Equilibrium Moisture Content Table", University of Arkansas, Division of Agriculture, [online]. [archived on Dec. 13, 2010]. Retrieved from the Internet: <URL: www.aragriculture.org/storage_drying/emc_table_builder.xls>, (2010), 1 pg.

"English language machine translation for DE 102004053167 A1", [Online] Retrieved from the Internet : <http://translationportal.epo.org>.

"International Application Serial No. PCT/U52012/046660, International Preliminary Report on Patentability dated Jan. 23, 2014", 8 pgs.

"International Application Serial No. PCT/US2012/046660, International Search Report dated Oct. 8, 2012", 4 pgs.

"International Application Serial No. PCT/US2012/046660, Written Opinion dated Oct. 8, 2012", 6 pgs.

"International Application Serial No. PCT/US2013/061625, International Search Report dated Dec. 11, 2013", 4 pgs.

"International Application Serial No. PCT/US2013/061625, Written Opinion dated Dec. 11, 2013", 9 pgs.

"International Application Serial No. PCT/US2013/061631, International Search Report dated Dec. 11, 2013", 3 pgs.

"International Application Serial No. PCT/US2013/061631 , Written Opinion dated Dec. 11, 2013", 8 pgs.

"Table N3.1: Equilibrium Moisture Content of Shelled Corn for Various Air Temperatures and Relative Humidities", Guidelines for Mold Control in High-Moisture Corn, USDA Bulletin No. 2238, [online]. [archived on Dec. 22, 2014]. Retrieved from the Internet: <URL: https://web.archive.org/web/20141222205647/http://www.caes.uga.edu/departments/bae/extension/handbook/doc, (2014), 3 pgs.

"Thin-Layer Drying of Grains and Crops", ASAE S448 Dec. 98; [online]. [archived on May 11, 2006]. Retrieved from the Internet: <URL: http://web.archive.org/web/20060511171927/http://www.bime.ntu.edu.tw/~dsfon/graindrying/ASAE/517.pdf>, (Dec. 1998), 3 pgs.

Al-Farayedhi, A. A, et al., "Regeneration of liquid desiccants using membrane technology", Energy Conversion and Management, 40(13), (Sep. 1999), 1405-1411.

Darracq, Guillaume, et al., "Silicone oil: An effective absorbent for the removal of hydrophobic volatile organic compounds", Journal of Chemical Technology and Biotechnology, 85(2), (Mar. 2010), 309-313.

Dobbins, Craig L., et al., "2011 Purdue Crop Cost & Return Guide", Purdue Exension, ID-166-W, (Jan. 27, 2011), 3 pgs.

(56) References Cited

OTHER PUBLICATIONS

Guo, Andrew, et al., "Highly Active Visible-Light Photocatalysts for Curing a Ceramic Precursor1", (Abstract Only), Chemistry of Mateirals, 10(2), 531-536, (1998), 1 pg.

Huang, Si-Min, et al., "Fluid flow and heat mass transfer in membrane parallel-plates channels used for liquid desiccant air dehumidification", International Journal of Heat and Mass Transfer, 55(9-10), (Apr. 2012), 2571-2580.

Isetti, Carlo, et al., "Three-fluid membrane contactors for improving the energy efficiency of refrigeration and air-handling systems", International Journal of Ambient Energy, DOI:10.1080/01430750. 2012.755905, (2013), 1-14.

Namvar, Ramin, et al., "+Transient characteristics of a liquid-to-air membrane energy exchanger (LAMEE) experimental data with correlations", International Journal of Heat and Mass Transfer, 55(23-24), (Nov. 2012), 6682-6694.

Uhrig, J. William, et al., "Costs of Drying High-Moisture Corn", Grain Quality Task Force, Fact Sheet #3, Purdue University, (Oct. 1, 1992), 4 pgs.

Xia, B., et al., "Regenerative Oil Scrubbing of Volatile Organic Compounds from a Gas Stream in Hollow Fiber Membrane Devices", Ind. Eng. Chem. Res., 38(9), (1999), 3462-3472.

Zhang, Li-Zhi, et al., "Conjugate heat and mass transfer in a cross-flow hollow fiber membrane contactor for liquid desiccant air dehumidification", International Journal of Heat and Mass Transfer, 55(25-26), (Dec. 2012), 8061-8072.

\* cited by examiner

METHOD AND APPARATUS FOR SEPARATING ONE OR MORE COMPONENTS FROM A COMPOSITION

CLAIM OF PRIORITY

This application is a continuation of and claims the benefit of priority to U.S. patent application Ser. No. 14/873,620, filed on Oct. 2, 2015, which is a continuation of and claims the benefit of priority to U.S. patent application Ser. No. 14/413,231 filed on Jan. 7, 2015, which is a national stage application under 35 U.S.C. § 371 of PCT Application No. PCT/US2013/061625, filed on Sep. 25, 2013 and published on Apr. 3, 2014 as WO 2014/052419, which claims the benefit of priority to U.S. Provisional Application Ser. No. 61/705,663, filed on Sep. 26, 2012 and to U.S. Provisional Application Ser. No. 61/778,952, filed on Mar. 13, 2013, which applications and publication are incorporated by reference herein in their entireties.

TECHNICAL FIELD

Separation processes can take advantage of differences between various components of a mixture to at least partially separate (e.g., via absorption) one or more components from the mixture, and are used in a wide variety of settings. For example, separation processes can be used to purify water, to cleanse blood during dialysis, and to separate gases or vapors. Other examples can include dehumidification of air, recovery of hydrogen gas in ammonia synthesis, recovery of hydrogen in petroleum refining, separation of methane from other components in biogas synthesis, enrichment of air with oxygen for medical or other purposes, infusion of gases into liquids, removal of water vapor from natural gas, dehydration of liquids, removal of carbon dioxide ($CO_2$) from natural gas or biogas, and carbon-capture applications such as the removal of $CO_2$ from flue gas streams generated by combustion processes. Separation processes can be expensive and time consuming.

SUMMARY OF THE INVENTION

In various embodiments, the present invention provides a method of separating one or more components from a feed composition. The method includes contacting at least some of a first component of a feed composition with an absorbent fluid. The feed composition includes the first component. The contacting provides a contacted composition and a used absorbent fluid. The used absorbent fluid includes at least some of the first component that was contacted with the absorbent fluid.

In various embodiments, the present invention provides a method of separating one or more components from a feed composition. The method includes contacting at least some of a first component of a feed composition with an absorbent fluid. The absorbent fluid includes an organosilicon fluid. The feed composition includes the first component. The organosilicon fluid includes an organosilicon including at least one of a hydroxy group, an ether group, an acrylate group, a methacrylate group, an acrylamide group, a methacrylamide group, and a polyether group. The contacting provides a contacted composition and a used absorbent fluid. The used absorbent fluid includes at least some of the first component that was contacted with the absorbent fluid.

In various embodiments, the present invention provides a method of separating one or more components from a composition. The method includes contacting a first side of a silicone membrane with a feed composition while contacting a second side of the membrane with an absorbent fluid. The feed composition includes a first component and a second component. The contacting produces a permeate mixture on the second side of the membrane. The permeate mixture includes a used absorbent fluid, and the permeate mixture is enriched in the first component with respect to the second component. The used absorbent fluid includes at least some of the first component. The contacting also produces a retentate mixture on the first side of the membrane. The retentate mixture includes the contacted feed composition, and the retentate mixture is depleted in the first component with respect to the second component.

In various embodiments, the present invention provides a method of desorbing one or more components from an absorbent fluid. The method includes desorbing at least some of a first component from an absorbent fluid including the first component. The absorbent fluid includes an organosilicon fluid. The organosilicon fluid includes an organosilicon. The organosilicon includes at least one of a hydroxy group, an ether group, an acrylate group, a methacrylate group, an acrylamide group, a methacrylamide group, and a polyether group. The method provides a desorbed absorbent fluid and the first component that was desorbed from the absorbent fluid.

In various embodiments, the present invention provides a system for separating one or more components from a composition. The system includes a feed composition. The feed composition includes a first component. The system includes an absorbent fluid. The system includes a contactor. The contactor contacts at least some of the first component with the absorbent fluid. The system includes a contactor. The contactor contacts at least some of the first component with the absorbent fluid. The system includes a contacted composition provided by the contactor. The system also includes a used absorbent fluid provided by the contactor. The used absorbent fluid includes at least some of the first component that the contactor contacted with the absorbent fluid. In some embodiments, the absorbent fluid is an organosilicon fluid. In some embodiments the organosilicon fluid includes an organosilicon including at least one of a hydroxy group, an ether group, an acrylate group, a methacrylate group, an acrylamide group, a methacrylamide group, and a polyether group. In some embodiments, the contactor includes a membrane, and contacts the feed composition to one side of the membrane and the absorbent fluid to the other side of the membrane during the contacting of the first component with the absorbent fluid. In some embodiments, the membrane contactor includes a silicone membrane.

In various embodiments, the present invention provides a system for desorbing one or more components from an absorbent fluid. The system includes an absorbent fluid. The absorbent fluid includes an organosilicon fluid including an organosilicon including at least one of a hydroxy group, an ether group, an acrylate group, a methacrylate group, an acrylamide group, a methacrylamide group, and a polyether group. The absorbent fluid includes a first component. The system includes a desorber that desorbs at least some of the first component from the absorbent fluid. The system includes a desorbed absorbent fluid provided by the desorber. The system also includes a first component that was desorbed from the absorbent fluid.

In various embodiments, the present invention includes a separation apparatus. The apparatus includes a contactor. The contactor contacts at least some of a first component in a feed composition with an absorbent fluid. The feed composition includes a first component. The contacting provides a contacted composition. The contacted composition is depleted in the first component. The contacting also provides a used absorbent fluid. The used absorbent fluid includes at least some of the first component that the contactor contacted with the absorbent fluid. In some embodiments, the absorbent fluid is an organosilicon fluid. In some embodiments the organosilicon fluid includes an organosilicon including at least one of a hydroxy group, an ether group, an acrylate group, a methacrylate group, an acrylamide group, a methacrylamide group, and a polyether group. In some embodiments, the contactor includes a membrane, and contacts the feed composition to one side of the membrane and the absorbent fluid to the other side of the membrane during the contacting of the first component with the absorbent fluid. In some embodiments, the membrane contactor includes a silicone membrane.

In various embodiments, the present invention provides a desorption apparatus. The desorption apparatus includes a desorber. The desorber desorbs at least some of a first component in an absorbent fluid. The absorbent fluid includes an organosilicon fluid including an organosilicon including at least one of a hydroxy group, an ether group, an acrylate group, a methacrylate group, an acrylamide group, a methacrylamide group, and a polyether group. The absorbent fluid includes the first component. The desorbing provides a desorbed absorbent fluid and a first component that was desorbed from the absorbent fluid.

Various embodiments of the present invention have advantages over other methods of separating one or more components from a feed composition or systems and apparatus for carrying out separation methods, at least some of which are unexpected. In some embodiments, the method, system, or apparatus can have advantages related to at least one of the absorbent fluid used and the manner in which the absorbent fluid is used. For example, in some embodiments, the absorbent fluid can be at least one of less toxic, less corrosive, less flammable, and less volatile than absorbents of other methods, systems, or apparatuses. In some embodiments, the absorbent fluid can absorb more of the one or more components to be separated per unit of mass than absorbents of other methods, systems, or apparatuses. In some embodiments, the absorbent fluid can absorb a larger mass per time of the one or more components to be separated than absorbents of other methods, systems, or apparatuses. In some embodiments, the absorbent fluid can have greater selectivity for absorption of the one or more components to be separated than absorbents of other methods, systems, or apparatuses. In some embodiments, the absorbent fluid can be regenerated with greater ease and efficiency than the absorbent fluid of other methods, systems, or apparatuses.

In some embodiments, the method, system, or apparatus can separate one or more components from a mixture more efficiently (e.g., in less time, using a smaller volume of absorbent material, or using less energy) or with less expense than other methods, systems, or apparatuses, including in some embodiments at least one of water, carbon dioxide, nitrogen. In some embodiments including the use of the absorbent fluid as a sweep fluid adjacent to a membrane, the absorbent fluid can provide enhanced flux of the first component across the membrane compared to other methods of using a membrane. In some embodiments, the method, system, or apparatus can separate one or more components from a feed mixture with greater speed than other methods. In some embodiments, the method, system, or apparatus can regenerate or reuse the absorbent fluid with greater ease or efficiency than other methods, systems, or apparatuses. In some embodiments, the method, system, or apparatus can separate specific components of certain mixture with greater speed, greater efficiency, and less cost, as compared to other methods, apparatuses, and systems. In embodiments including a membrane, various embodiments of the present invention can provide more efficient separation using the membrane than other methods of separation using the membrane, and systems and apparatuses for performing the same, such as including different sweep fluids or no sweep fluid.

In some embodiments, the method, system, or apparatus can be used with lower temperatures or pressures, or with smaller temperature or pressure swings, than other methods, systems, or apparatus for separation of one or more components from a composition using an absorptive process. In some embodiments, the method, system, or apparatus can use a less-corrosive absorptive fluid than other methods, systems, or apparatus, which can extend system lifetime, durability, and reliability. Various embodiments of the method, system, or apparatus can have decreased costs relating to the contactor and additionally ancillary equipment costs and ancillary operating costs.

In various embodiments, the method, system, or apparatus can separate water (e.g., as a liquid or a gas) from a gaseous or liquid feed composition more efficiently than other methods, systems, or apparatuses. In some embodiments, the absorbent fluid can be more selective for water than other absorbents. In some embodiments, the absorbent fluid can absorb more water faster or with less mass of absorbent than in other methods. In some embodiments, the absorbent fluid can require less energy to desorb solutes such as water vapor than other absorbent fluids.

DETAILED DESCRIPTION OF THE INVENTION

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods of manufacturing described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range. The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "organic group" as used herein refers to but is not limited to any carbon-containing functional group. Examples include acyl, cycloalkyl, aryl, aralkyl, heterocyclyl, heteroaryl, or heteroarylalkyl, linear and/or branched groups such as alkyl groups, fully or partially halogen-substituted haloalkyl groups, alkenyl groups, alkynyl groups, acrylate and methacrylate functional groups; and other organic functional groups such as ether groups, cyanate ester groups, ester groups, carboxylate salt groups, and masked isocyano groups.

The term "substituted" as used herein refers to an organic group as defined herein or molecule in which one or more bonds to a hydrogen atom contained therein are replaced by one or more bonds to a non-hydrogen atom. The term "functional group" or "substituent" as used herein refers to a group that can be or is substituted onto a molecule, or onto an organic group. Examples of substituents or functional groups include, but are not limited to, any organic group, a halogen (e.g., F, Cl, Br, and I); a sulfur atom in groups such as thiol groups, alkyl and aryl sulfide groups, sulfoxide groups, sulfone groups, sulfonyl groups, and sulfonamide groups; a nitrogen atom in groups such as amines, hydroxylamines, nitriles, nitro groups, N-oxides, hydrazides, azides, and enamines; and other heteroatoms in various other groups.

As used herein, the term "hydrocarbyl" refers to a functional group derived from a straight chain, branched, or cyclic hydrocarbon, such as an alkyl, alkenyl, alkynyl, aryl, cycloalkyl, acyl, or a combination thereof. A hydrocarbyl group can be unsubstituted or substituted.

The term "alkyl" as used herein refers to straight chain and branched alkyl groups and cycloalkyl groups having from 1 to about 20 carbon atoms, and typically from 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, isobutyl, sec-butyl, t-butyl, neopentyl, isopentyl, and 2,2-dimethylpropyl groups. As used herein, the term "alkyl" encompasses all branched chain forms of alkyl. Representative substituted alkyl groups can be substituted one or more times with any functional group, for example.

The term "alkenyl" as used herein refers to straight and branched chain and cyclic alkyl groups as defined herein, except that at least one double bond exists between two carbon atoms. Thus, alkenyl groups have from 2 to about 20 carbon atoms, and typically from 2 to 12 carbons or, in some embodiments, from 2 to 8 carbon atoms. Examples include, but are not limited to vinyl, —CH=CH(CH$_3$), —CH=C (CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl, among others.

The term "resin" as used herein refers to polysiloxane material of any viscosity that includes at least one siloxane monomer that is bonded via a Si—O—Si bond to three or four other siloxane monomers. In one example, the polysiloxane material includes T or Q groups, as defined herein.

The term "number-average molecular weight" as used herein refers to the ordinary arithmetic mean of the molecular weight of individual molecules in a sample. It is defined as the total weight of all molecules in a sample divided by the total number of molecules in the sample. Experimentally, the number average molecular weight ($M_n$) is determined by analyzing a sample divided into molecular weight fractions of species i having $n_i$ molecules of molecular weight $M_i$ through the formula $M_n=\Sigma M_i n_i/\Sigma n_i$. The number average molecular weight can be measured by a variety of well-known methods including gel permeation chromatography, spectroscopic end group analysis and osmometry. If unspecified, molecular weights of polymers given herein are number-average molecular weights.

The term "radiation" as used herein refers to energetic particles travelling through a medium or space. Examples of radiation are visible light, infrared light, microwaves, radio waves, very low frequency waves, extremely low frequency waves, thermal radiation (heat), and black-body radiation.

The term "light" as used herein refers to electromagnetic radiation in and near wavelengths visible by the human eye, and includes ultra-violet (UV) light and infrared light, from about 10 nm to about 300,000 nm wavelength.

The term "cure" as used herein refers to exposing to radiation in any form, heating, or allowing to undergo a physical or chemical reaction that results in hardening or an increase in viscosity.

The term "pore" as used herein refers to a depression, slit, or hole of any size or shape in a solid object. A pore can run all the way through an object or partially through the object. A pore can intersect other pores.

The term "free-standing" or "unsupported" as used herein refers to a membrane with the majority of the surface area on each of the two major sides of the membrane not contacting a substrate, whether the substrate is porous or not. In some embodiments, a membrane that is "free-standing" or "unsupported" can be 100% not supported on both major sides. A membrane that is "free-standing" or "unsupported" can be supported at the edges or at the minority (e.g., less than about 50%) of the surface area on either or both major sides of the membrane.

The term "supported" as used herein refers to a membrane with the majority of the surface area on at least one of the two major sides contacting a substrate, whether the substrate is porous or not. In some embodiments, a membrane that is "supported" can be 100% supported on at least one side. A membrane that is "supported" can be supported at any suitable location at the majority (e.g., more than about 50%) of the surface area on either or both major sides of the membrane.

The term "enrich" as used herein refers to increasing in quantity or concentration, such as of a liquid, gas, or solute. For example, a mixture of gases A and B can be enriched in gas A if the concentration or quantity of gas A is increased, for example by selective permeation of gas A through a membrane to add gas A to the mixture, or for example by selective permeation of gas B through a membrane to take gas B away from the mixture.

The term "deplete" as used herein refers to decreasing in quantity or concentration, such as of a liquid, gas, or solute. For example, a mixture of gases A and B can be depleted in gas B if the concentration or quantity of gas B is decreased, for example by selective permeation of gas B through a membrane to take gas B away from the mixture, or for example by selective permeation of gas A through a membrane to add gas A to the mixture.

The term "solvent" as used herein refers to a liquid that can dissolve a solid, liquid, or gas. Nonlimiting examples of solvents are silicones, organic compounds, water, alcohols, ionic liquids, and supercritical fluids.

The term "selectivity" or "ideal selectivity" as used herein refers to the ratio of permeability of the faster permeating gas over the slower permeating gas, measured at room temperature.

The term "permeability" as used herein refers to the permeability coefficient ($P_x$) of substance X through a membrane, where $q_{mx}=P_x*A*\Delta p_x*(1/\delta)$, where $q_{mx}$ is the volumetric flow rate of substance X through the membrane, A is the surface area of one major side of the membrane through which substance X flows, $\Delta p_x$ is the difference of the partial pressure of substance X across the membrane, and $\delta$ is the thickness of the membrane. $P_x$ can also be expressed as $V \cdot \delta/(A \cdot t \cdot \Delta p)$, wherein $P_x$ is the permeability for a gas X in the membrane, V is the volume of gas X which permeates through the membrane, $\delta$ is the thickness of the membrane, A is the area of the membrane, t is time, $\Delta p$ is the pressure difference of the gas X at the retente and permeate side. Permeability is measured at room temperature, unless otherwise indicated.

The term "Barrer" or "Barrers" as used herein refers to a unit of permeability, wherein 1 Barrer=$10^{-11}$ ($cm^3$ gas) cm $cm^{-2}$ $s^{-1}$ $mmHg^{-1}$, or $10^{-10}$ ($cm^3$ gas) cm $cm^{-2}$ $s^{-1}$ cm $Hg^{-1}$, where "$cm^3$ gas" represents the quantity of the gas that would take up one cubic centimeter at standard temperature and pressure.

The term "total surface area" as used herein with respect to membranes refers to the total surface area of the side of the membrane exposed to the feed gas mixture.

The term "air" as used herein refers to a mixture of gases with a composition approximately identical to the native composition of gases taken from the atmosphere, generally at ground level. In some examples, air is taken from the ambient surroundings. Air has a composition that includes approximately 78% nitrogen, 21% oxygen, 1% argon, and 0.04% carbon dioxide, as well as small amounts of other gases.

The term "room temperature" as used herein refers to a temperature of about 15° C. to 28° C.

The term "absorption" or "absorb" as used herein refers to dissolving or carrying an absorbed component. For example, a fluid can absorb a gas as at least one of a dissolved gas, and as bubbles of any suitable size such as to allow transport of the gas in the fluid. An absorption process can include any suitable mechanism, such as chemical interactions (e.g., chemisorption), physical interactions (e.g., physisorption), bulk interactions, surface interactions (e.g., adsorption), or combinations thereof.

The term "desorption" or "desorb" as used herein refers to ejecting an absorbed component.

Method of Separating One or More Components from a Feed Composition

In various embodiments, the present invention provides a method of separating one or more components from a feed composition. The feed composition includes at least a first component. In some embodiments, the feed composition includes a first component and a second component; in some embodiments, the feed composition does not include a second component. The method can include contacting at least some of a first component of a feed composition with an absorbent fluid, to provide a contacted composition and a used absorbent fluid including at least some of the first component contacted with the organosilicon fluid.

The contacting can be any suitable type of contacting, such as contacting the first component to the absorbent fluid by contacting the feed composition to one side of a membrane and contacting the absorbent fluid to the other side. Contacting can include contacting the feed composition and the absorbent fluid (e.g., the first and second components can be contacted with the absorbent fluid). In some embodiments, the absorbent fluid can include an organosilicon fluid. The organosilicon fluid can include an organosilicon including at least one of a hydroxy group, an ether group, an acrylate group, a methacrylate group, an acrylamide group, a methacrylamide group, and a polyether group.

In various embodiments, the present invention can provide a method of separating one or more components from a composition. The method can include contacting a first side of a silicone membrane with a feed composition while contacting a second side of the membrane with an absorbent fluid. The feed composition can include at least a first component and a second component. The contacting produces a permeate mixture on the second side of the membrane including at least some of the first component. The contacting also produces a retentate mixture on the first side of the membrane including the contacted feed composition. The permeate mixture is enriched in the first component and the retentate mixture is depleted in the first component.

In embodiments wherein the feed composition includes no second component, the feed composition includes at least a first component, and can optionally include any other component in any suitable mixture therewith. In some embodiments, the feed composition can be carbon dioxide liquid, gas, or a combination thereof. In some embodiments, the feed composition can be oxygen liquid, gas, or a combination thereof.

In embodiments wherein the feed composition includes both a first component and a second component, the feed composition can by any suitable mixture of the first component, the second component, and any other component. The feed composition can include the first and second component at any suitable concentration therein. As used herein, a gas can be a gas or a vapor. In some embodiments, the feed composition is a gaseous composition or vaporous composition; each of the one or more components separated from a gaseous composition can independently be a gas or a liquid. In some embodiments, the feed composition is a liquid composition; each of the one or more components separated from a liquid composition can independently be a gas or a liquid. In some embodiments, the feed composition includes any suitable combination of gas and liquid; each of the one or more components separated from the feed composition can independently be a gas or a liquid. The feed composition can include any compound or combination of compounds dissolved or suspended therein, wherein the compounds can be liquids, solid, or gas in pure form at standard temperature and pressure.

The first component can be any suitable material that can be absorbed by the absorbent fluid, for example as a miscible liquid, a dissolved gas, or a combination thereof. In some embodiments, the first component is oxygen, hydrogen, carbon dioxide, or water. In some embodiments, the first component is an organic compound. The organic compound can be any suitable organic compound that is absorbed by the absorbent fluid, such as an organic liquid or an organic gas. In some embodiments wherein the feed composition includes both a first component and a second component, the absorbent fluid preferentially absorbs the first component over the second component. In other embodiments, the absorbent fluid absorbs both the first component and the second component. The second component can be any suitable material. For example, the second component can be air, air depleted in the first component, oxygen, hydrogen, carbon dioxide, water, an organic compound, or any combination thereof.

In some embodiments, the feed composition is an ammonia synthesis reaction product, and the first component is hydrogen gas. In some embodiments, the feed composition is a product of petroleum refining, and the first component is hydrogen gas or a hydrocarbon. In some embodiments, the feed composition is a product from the production of natural gas, and the first component is at least one of carbon dioxide, water, vapor, hydrogen sulfide, ethylene, or any suitable non-methane component. In some embodiments, the feed composition is air, and the first component is at least one of oxygen, hydrogen, carbon dioxide, or water. In some embodiments, the feed component is a product of a combustion process, such as a flue gas stream, and the first component is carbon dioxide or a pollutant.

Contacting

The method includes contacting at least some of the first component of the feed composition with the absorbent fluid. The contacting can be any suitable contacting, so long as the first component of the feed composition is contacted with the absorbent fluid. In some embodiments, all of the feed composition is contacted with the absorbent fluid. In other embodiments, only part of the feed composition is contacted with the absorbent fluid.

In some embodiments, the feed composition and the absorbent fluid are not directly contacted during the contacting of the first component of the feed composition with the feed composition. In some embodiments, the feed composition and the absorbent fluid can be separated by a suitable barrier, such that the barrier preferentially allows permeation of certain components including the first component. For example, the barrier can be one or more membranes, as described herein.

In some embodiments, the feed composition and the absorbent fluid are directly contacted during the contacting of the first component of the feed composition with the feed composition. Any suitable method of direct contacting can be used. For example, direct contacting can include flowing a gas over the absorbent fluid or bubbling directly into the absorbent fluid. For example, the contacting can include contacting in a packed bed column or tower with any appropriate packing material (for example, random or structured packing or other packing material), a trayed tower column or tower with any appropriate tray type such as a sieve tray, valve tray, or bubble cap tray with any appropriate tray spacing and feed stream positions, a distillation column or tower with any appropriate tray type such as a sieve tray, valve tray, or bubble cap tray with any appropriate tray spacing and feed stream positions, a liquid spray column or tower with any appropriate packing material, for example random or structured packing or other packing material, a centrifugal contactor, a rotating surface such as a wheel or tray, a falling film device that features one or more immobile surfaces that permits gas contact with a falling thin film of liquid, across a porous polymeric or inorganic membrane, or any combination thereof.

In embodiments including a membrane, various embodiments of the present invention can provide a system that allows limited or no heat transfer from the absorbent fluid to the feed components or retentate components or vice versa. In embodiments including a membrane, various embodiments of the present invention can provide a system that allows substantial heat transfer from the absorbent fluid to the feed components or retentate components or vice versa. Various embodiments provide a system that allows concurrent heat and mass exchange between the feed composition and the sorbent fluid, as exemplified by a liquid desiccant air conditioner. In embodiments including a membrane, various embodiments of the present invention can provide a system that limits or prevents volatile absorbent fluids from the permeate component stream of the membrane from entering the feed component stream or retentate component stream, thereby reducing the amount of absorbent fluid exiting the system.

The first component can be water. In various embodiments, the contacting and the absorbent fluid can be sufficient for the absorbent fluid to absorb about $1.0\text{-}1.0\times10^{-14}$ mol $H_2O$/Pa·g of the absorbent fluid, $1.0\times10^{-3}\text{-}1.0\times10^{-12}$, or about $1.0\times10^{-4}\text{-}1.0\times10^{-10}$ mol $H_2O$/Pa·g of the absorbent fluid. In some embodiments, the contacting and the absorbent fluid can be sufficient for the absorbent fluid to absorb about $1\times10^{-14}$ or less mol $H_2O$/Pa·g of the absorbent fluid, or about $1\times10^{-13}$, $1\times10^{-12}$, $1\times10^{-11}$, $1\times10^{-10}$, $1\times10^{-9}$, $1\times10^{-8}$, $1\times10^{-7}$, $1\times10^{-6}$, $1\times10^{-5}$, $1\times10^{-4}$, $1\times10^{-3}$, $1\times10^{-2}$, $1\times10^{-1}$, or about 1 or more mol $H_2O$/Pa·g of the absorbent fluid. In some embodiments, the feed composition further includes nitrogen, natural gas, air, or a combination thereof.

The first component can be carbon dioxide. In various embodiments, the contacting and the absorbent fluid can be sufficient for the absorbent fluid to absorb about $1.0\times10^{-1}\text{-}1.0\times10^{-15}$ mol $CO_2$/Pa·g of the absorbent fluid, $1.0\times10^{-5}\text{-}1.0\times10^{-13}$ mol $CO_2$/Pa·g of the absorbent fluid, or about $1.0\times10^{-6}\text{-}1.0\times10^{-12}$ mol $CO_2$/Pa·g of the absorbent fluid. In some embodiments, the contacting and the absorbent fluid can be sufficient for the absorbent fluid to absorb about $1\times10^{-15}$, $1\times10^{-14}$, $1\times10^{-13}$, $1\times10^{-12}$, $1\times10^{-11}$, $1\times10^{-10}$, $1\times10^{-9}$, $1\times10^{-8}$, $1\times10^{-7}$, $1\times10^{-6}$, $1\times10^{-5}$, $1\times10^{-4}$, $1\times10^{-3}$, $1\times10^{-2}$, or about $1\times10^{-1}$ or more mol $CO_2$/Pa·g of the absorbent fluid. In some embodiments, the feed composition further includes nitrogen, natural gas, air, or any combination thereof.

The first component can be oxygen. In various embodiments, the contacting and the absorbent fluid can be sufficient for the absorbent fluid to absorb about $1.0\times10^{-2}\text{-}1.0\times10^{-16}$ mol $O_2$/Pa·g of the absorbent fluid, $1.0\times10^{-6}\text{-}1.0\times10^{-14}$ mol $O_2$/Pa·g of the absorbent fluid, or about $1.0\times10^{-7}\text{-}1.0\times10^{-13}$ mol $O_2$/Pa·g of the absorbent fluid. In some embodiments, the contacting and the absorbent fluid can be sufficient for the absorbent fluid to absorb about $1\times10^{-16}$, $1\times10^{-15}$, $1\times10^{-14}$, $1\times10^{-13}$, $1\times10^{-12}$, $1\times10^{-11}$, $1\times10^{-10}$, $1\times10^{-9}$, $1\times10^{-8}$, $1\times10^{-7}$, $1\times10^{-6}$, $1\times10^{-5}$, $1\times10^{-4}$, $1\times10^{-3}$, or about $1\times10^{-2}$ or more mol $O_2$/Pa·g of the absorbent fluid. In some embodiments, the feed composition can further include nitrogen, air, or any combination thereof.

Membrane

In various embodiments, the contacting of the first component and the absorbent fluid can include contacting a first side of a membrane with the feed composition while contacting a second side of the membrane with the absorbent fluid. The membrane can be any suitable membrane, such that it can contact the first component and the absorbent fluid while the feed composition is contacted to one side of the membrane and the absorbent fluid is contacted to the other side of the membrane, under suitable conditions. The membrane can include polymers, inorganic components, or a combination thereof. In some embodiments, the membrane includes a ceramic, such as alumina, titanic, zirconia oxide, or a glassy material. The membrane can be a dense membrane or a porous membrane. In some embodiments, the membrane includes a polymer such as cellulose acetate, nitrocellulose, a cellulose ester, a polysulfone, a polyether sulfone, a polyacrylonitrile, a polyamide, a polyimide, a polyethylene, a polypropylene, a polytetrafluoroethylene, a polyvinylidene fluoride, a polyvinylchloride, a copolymer thereof, wherein each monomer of the polymer or copolymer can be substituted or unsubstituted. The membrane can include any suitable organosilcon, such as an organosilane or an organopolysiloxane.

Any number of membranes can be used to accomplish the separation. Any combination of free-standing and supported membranes can be used. Any suitable surface area of the one or more membranes can be used. For example, the surface area of each membrane, or the total surface area of the membranes, can be about 0.01 m$^2$, 0.1, 1, 2, 3, 4, 5, 10, 100, 200, 300, 400, 500, 600, 700, 800, 900, 1000, 1200, 1400, 1600, 1800, 2000, 2200, 2400, 2600, 2800, 3000, 3200, 3400, 3800, 4000, 5000, 10,000, 50,000, 100,000, 500,000, or about 1,000,000 m$^2$.

The membrane can have any suitable thickness. In some examples, the membrane can have a thickness of about 1 µm to about 20 µm, or about 2, 3, 4, 5, 6, 7, 8, 9, 10, 11, 12, 13, 14, or 15 µm to about 20 µm. In some examples, the membrane have a thickness of about 0.1 µm to about 200 µm, or about 10, 15, 20, 25, or 30 µm to about 200 µm. In other examples, the membrane have a thickness of about 0.01 µm to about 2000 µm, or about 10, 15, 20, 25, 30, 40, 50, or 60 µm to about 2000 µm.

The membrane can be selectively permeable to one or more suitable substances over another; the substances to which the membrane can be selectively permeable can be any suitable substance. In one embodiment, the membrane can be selectively permeable to one gas over other gases or liquids. In another embodiment, the membrane can be selectively permeable to more than one gas over other gases or liquids. In one embodiment, the membrane can be selectively permeable to one liquid over other liquids or gases. In another embodiment, the membranes can be selectively permeable to more than one liquid over other liquids. In an embodiment, the membrane can be selectively permeable to water, carbon dioxide, or methane over other gases or liquids. In some embodiments, the membrane has a $CO_2/N_2$ selectivity at room temperature of at least about 1-150, 10-75, or about 20-40 when tested without the liquid present. In some embodiments, the membrane has a $CO_2/CH_4$ selectivity at room temperature of at least about 1-150, 10-75, or about 20-40 when tested without the liquid present. In some embodiments, the membrane has a $CO_2$ permeation coefficient of about 0.001 or less, or at least about 0.01 Barrer, 0.1, 1, 5, 10, 20, 30, 40, 50, 60, 70, 80, 90, 100, 120, 140, 160, 180, 200, 240, 280, 300, 400, 500, 600, 700, 800, 900, 1000, 1200, 1400, 1600, 1800, or at least about 2000 Barrer, when tested at room temperature without the liquid present. In some embodiments, the membrane has a $CH_4$ permeation coefficient of at least about 0.001 Barrer or less, or at least about 0.001, 0.01, 0.1, 1, 2, 4, 6, 8, 10, 12, 14, 16, 18, 20, 30, 40, 50, 60, 70, 80, 90, or at least about 100 Barrer, when tested at room temperature without the liquid present. In some embodiments, the membrane has an $H_2O$/nitrogen selectivity of at least about 50, at least about 90, at least about 100, at least about 120, at least about 130, at least about 150, at least about 200, or at least about 250 at room temperature, when tested at room temperature without the liquid present. In some embodiments, the membrane has an $H_2O$ in air vapor permeability coefficient of at least about 10,000 Barrer, 15,000, 20,000, 25,000, 30,000, 35,000, 40,000, 50,000, 60,000, or at least about 70,000 Barrer at room temperature, when tested at room temperature without the liquid present. Permeability can be measured in any suitable fashion, for example, as described in the Examples.

The membrane of the present invention can have any suitable shape. In some embodiments, the membrane is a plate-and-frame membrane, a spiral wound membrane, a tubular membrane, a capillary fiber membrane, or a hollow fiber membrane. The membrane can be a hollow fiber membrane module containing a plurality of hollow fiber membranes, each fiber having a bore side and a shell side. The fibers in a hollow fiber membrane module can collectively have a bore side and a shell side accessible through a single connector on each side of the module. Alternately, the fibers in a hollow fiber membrane module can have a bore side and a shell side accessible through multiple connectors placed at various points in the module. In some embodiments of the method, the gaseous mixture can be contacted to the bore side of the one or more hollow fiber membranes, and the organosilicon fluid can be contacted to the shell side. In other embodiments of the method, the gaseous mixture can be contacted to the shell side of the one or more hollow fiber membranes, and the organosilicon fluid can be contacted to the bore side. In embodiments, the gas or liquid contacted to the shell side and bore side can be introduced in any flow pattern with respect to one another that is known in the art, for example crosscurrent (e.g., shell and bore side streams move at approximately right angles to one another), co-current (e.g., shell and bore side streams move in approximately the same direction with respect to one another), or countercurrent (e.g., shell and bore side streams move in approximately opposite directions with respect to one another), or combinations thereof, with flow relationships occurring in, for example, a linear or radial pattern.

In some embodiments, the membrane is a dense membrane. Some types of pores can penetrate from one major side of a membrane to another major side, such as cylindrical pores shaped approximately as cylinders, or such as sponge pores (e.g., pores that include randomly shaped cavities or channels), that form a connection from one major side to the other major side. Some types of pores do not penetrate from one major side of a membrane to another major side, such as blind pores, also referred to as surface pores. Some types of sponge pores also do not penetrate from one major side of the membrane to the other major side. In some embodiments, a dense membrane can include substantially no pores, including both pores that penetrate from one major side to the other major side, and including pores that do not penetrate from one major side to the other major side, such as less than about 100,000 pores per mm$^2$, or less than about 10,000, 1000, 100, 50, 25, 20, 15, 10, 5, or less than about 1 pore per mm$^2$. In some embodiments, a dense membrane can include substantially no pores that penetrate from one side to the other, such as less than about 100,000 penetrating pore per mm$^2$, or less than about 10,000, 1000, 100, 50, 25, 20, 15, 10, 5, or less than about 1 penetrating pore per mm$^2$, but the membrane can also include any suitable number of pores that do not penetrate from one major side of the membrane to the other major side of the membrane, such as at least one of surface pores and sponge pores, such as equal to or more than about 100,000 non-penetrating pores per mm$^2$, or less than 10,000, 1000, 100, 50, 25, 20, 15, 10, 5, or equal to or more than about 1 non-penetrating pore per mm$^2$. In some embodiments, the dense membrane can have substantially zero pores penetrating from one major side of the membrane to the other major side having a diameter larger than about 0.00001, 0.0001, 0.001, 0.005, 0.01, 0.05, 0.1, 0.2, 0.3, 0.4, 0.5, 0.6, 0.7, 0.8, 0.9, 1, or larger than about 2 µm, such as less than about 100,000 pores per mm$^2$, or less than about 10,000, 1000, 100, 50, 25, 20, 15, 10, 5, or less than about 1 pore per mm$^2$. Pore size can be determined by the average size of the pore throughout its path through the entire thickness or only partway through the membrane. Pore size can be determined by the average size of the pore at the surface of the membrane. Any suitable analytical technique can be used to determine the pore size. Dense membranes can have any combination of approximate maximum sizes from the dimensions given in this paragraph for each of the pores passing all the way through the membrane, cylinder pores, sponge pores, blind pores, any other type of pore, or any combination thereof. In some embodiments, the dense membrane does have at least one of pores passing all the way through the membrane, cylinder pores, sponge pores, blind pores, and any other type of pore, wherein the pores have a size smaller than the maximum size of the dimensions given in this paragraph.

The membrane can be free-standing or supported by a porous substrate. In some embodiments, the pressure on each major side of the membrane can be about the same. In other embodiments, there can be a pressure differential between one side of the membrane and the other side of the membrane. For example, the pressure on the feed and retentate side of the membrane can be higher than the pressure on the permeate side of the membrane. In other examples, the pressure on the permeate side of the membrane can be higher than the pressure on the retentate side of the membrane.

In one example, the membrane is a hollow tube or fiber membrane. Any number of hollow tube or fiber membranes can be used. For example, 1 hollow tube or fiber membrane, 2, 3, 4, 5, 10, 20, 50, 100, 500, 1000, 2000, 5000, 10,000, 100,000 or about 1,000,000 hollow tube or fiber membranes can be used together as the one or more membranes. The one or more hollow tube or fiber membranes can be in the form of a modular cartridge, such that the one or more membranes can be easily replaced or maintained. In one embodiment, the inside of the one or more hollow tube or fiber membranes can be the first side of the one or more membranes, and the outside of the one or more hollow tube or fiber membranes can be the second side of the one or more membranes. In another embodiment, the outside of the one or more hollow tube or fiber membranes can be the first side of the one or more membranes, and the inside of the one or more hollow tube or fiber membranes can be the second side of the one or more membranes. In some examples, a pressure difference is maintained between the first and second side of the one or more hollow tube or fiber membranes.

In some embodiments of the present invention, the membrane is supported on a porous or highly permeable non-porous substrate. The substrate can be any suitable substrate, such as a porous or nonporous substrate, a fiber or hollow fiber, a polymer, a water-soluble polymer, and can any suitable size or shape. A supported membrane has the majority of the surface area of at least one of the two major sides of the membrane contacting a porous or highly permeable non-porous substrate. A supported membrane on a porous substrate can be referred to as a composite membrane, where the membrane is a composite of the membrane and the porous substrate. The porous substrate on which the supported membrane is located can allow gases or liquids to pass through the pores and to reach the membrane. The supported membrane can be attached (e.g., adhered) to the porous substrate. The supported membrane can be in contact with the substrate without being adhered. The porous substrate can be partially integrated, fully integrated, or not integrated into the membrane.

In some embodiments of the present invention, the membrane is unsupported, also referred to as free-standing. The majority of the surface area on each of the two major sides of a membrane that is free-standing is not contacting a substrate, whether the substrate is porous or not. In some embodiments, a membrane that is free-standing can be 100% unsupported. A membrane that is free-standing can be supported at the edges or at the minority (e.g., less than 50%) of the surface area on either or both major sides of the membrane. A free-standing membrane can have any suitable shape, regardless of the percent of the free-standing membrane that is supported. Examples of suitable shapes for free-standing membranes include, for example, squares, rectangles, circles, tubes, cubes, spheres, cones, cylinders, and planar sections thereof, with any thickness, including variable thicknesses.

Silicone Membrane

In some examples, the membrane is a silicone membrane. A silicone membrane, as used here, designates a membrane that includes a reaction product (e.g., a cured product) of a curable organosilicon composition that includes at least one curable organopolysiloxane, wherein the curing can be any suitable curing method, such as hydrosilylation curing, condensation curing, free-radical curing, amine-epoxy curing, radiative curing, evaporative curing, cooling, or any combination thereof. For example, the silicone membrane can include at least one crosslinked organopolysiloxane.

The curable organosilicon composition can be any suitable organosilicon composition. The curing of the organosilicon composition gives a cured product of the organosilicon composition. The curable organosilicon composition can include at least one suitable curable organopolysiloxane compound having at least one functional group thereon that allows for curing. The curable organosilicon composition includes suitable components to allow the composition to be curable. In addition to the at least one suitable polysiloxane, the organosilicon composition can include any suitable additional ingredients, including any suitable organic or inorganic component, including components that do not include silicon, or including components that do not include a polysiloxane structure.

The curable organosilicon composition can include molecular components that have properties that allow the composition to be cured. In some embodiments, the properties that allow the organosilicon composition to be cured are specific functional groups. In some embodiments, an individual compound contains functional groups or has properties that allow the organosilicon composition to be cured by one or more curing methods. In some embodiments, one compound can contain functional groups or have properties that allow the organosilicon composition to be cured in one fashion, while another compound can contain functional groups or have properties that allow the organosilicon composition to be cured in the same or a different fashion. The functional groups that allow for curing can be located at pendant or, if applicable, terminal positions in the compound.

The curable organosilicon composition can include an organic compound. The organic compound can be any suitable organic compound. The organosilicon composition can include, for example, an organosilicon compound. The organosilicon compound can be any organosilicon compound. The organosilicon compound can be, for example, a silane (e.g. an organosilane), a polysilane (e.g., an organopolysilane), a siloxane (e.g., an organosiloxane such as an organomonosiloxane or an organopolysiloxane), or a polysiloxane (e.g., an organopolysiloxane), such as any suitable one of such compound as known in the art. The curable organosilicon composition can contain any number of suitable organosilicon compounds, and any number of suitable organic compounds. An organosilicon compound can include any functional group that allows for curing.

In some embodiments, the organosilicon compound can include a silicon-bonded hydrogen atom, such as organohydrogensilane or an organohydrogensiloxane. In some embodiments, the organosilicon compound can include an alkenyl group, such as an organoalkenylsilane or an organoalkenyl siloxane. In other embodiments, the organosilicon compound can include any functional group that allows for curing. The organosilicon compound can be an organosilane that is a monosilane, disilane, trisilane, or polysilane. Similarly, the organosilicon compound can be a polyorganosiloxane that can be a disiloxane, trisiloxane, or polysiloxane. The structure of the organosilicon compound can be linear, branched, cyclic, or resinous. In some examples, an organopolysiloxane compound has an average of at least one, two, or more than two functional groups that allow for curing. An organopolysiloxane compound can be a homopolymer or a copolymer.

Embodiments of the membrane include a cured product of a silicone composition. Various methods of curing can be used, including any suitable method of curing, including for example hydrosilylation curing, condensation curing, free-radical curing, amine-epoxy curing, radiation curing, cooling, or any combination thereof.

Absorbent Fluid

The method includes contacting at least some of a first component of the feed composition with an absorbent fluid. The absorbent fluid can be any suitable absorbent fluid, such that the absorbent fluid can absorb at least some of the first component and at least partially separate the first component from the feed composition. In some embodiments, the absorbent fluid can be an adsorbent fluid; e.g., the absorbent fluid can be a sorbent fluid. In some embodiments, the absorbent fluid can absorb the first component and the second component (if present). In some embodiments, the absorbent fluid can absorb the first component at a higher rate than the second component; in other embodiments, the absorbent fluid can absorb the first component at substantially the same rate as the second component. In some embodiments, the absorbent fluid can absorb the first component but does not appreciably absorb the second component.

The absorbent fluid can include one compound or more than one compound. In one embodiment, the absorbent fluid can includes at least one of an organopolysiloxane, organosilane, a glycol (e.g., propylene glycol, dipropylene glycol, tripropylene glycol, hexylene glycol, butylene glycol, ethylene glycol, diethylene glycol, triethylene glycol, tetraethylene glycol), a polyol (e.g., a sugar polyol (e.g., glycerol, sorbitol, xylitol, or malitol), a polymeric polyol (e.g., polydextrose, sugar siloxane)), glyceryl triacetate, vinyl alcohol, an acrylate, a methacrylate, an acrylamide, a methacrylamide, neoagarobiose, quilaia, lactic acid, sulfuric acid, aqueous sulfuric acid, urea, glycerin, aloe vera gel, an alpha-hydroxy acid (e.g., lactic acid), honey, activated alumina, an aerogel, benzophenone, bentonite clay, calcium chloride, calcium sulfate, cobalt(II) chloride, copper(II) sulfate, lithium chloride, lithium bromide, magnesium sulfate, magnesium perchlorate, a molecular sieve, potassium carbonate, a silica gel, sodium, sodium chlorate, sodium chloride, sodium hydroxide, sodium sulfate, sucrose, water, an organic solvent, an aqueous or organic solution thereof, or any combination thereof.

Examples of the absorbent fluid can include one or more of fluids selected from a water-compatible organic polymer and an alcohol-compatible organic polymer. The polymer can be homopolymeric, copolymeric, and can be linear, branched, hyperbranched, dendrimeric, or crosslinked to any suitable extent. Examples of suitable organic polymers include, but are not limited to, gelatin, methylcellulose, hydroxyethyl methyl cellulose, hydroxypropyl methyl cellulose, polyethylene oxide, polyacrylamides, poly(n-isopropylacrylamide), poly(N,N-dimethyl acrylamide), polyacrylic acid, polymethacrylic acid, salts of polyacrylic acid, salts of polymethacrylic acid, poly(2-hydroxyethyl methacrylate), polylactic acid, polyglycolic acid, polyvinylalcohol, polyanhydrides such as poly(methacrylic) anhydride, poly(acrylic) anhydride, polysebacic anhydride, collagen, poly(hyaluronic acid), hyaluronic acid-containing polymers and copolymers, polypeptides, sugars, dextran, dextran sulfate, chitosan, chitin, agarose gels, fibrin gels, soy-derived hydrogels and alginate-based hydrogels such as poly(sodium alginate), and combinations thereof. In some embodiments, the polymer can include a water compatible or alcohol compatible non-polymeric organic molecule such as glycerol or alkylether derivatives. In some embodiments, the sorbent fluid comprises a compatibilized mixture of an organosilane fluid or organopolysiloxane fluid with any of the above listed polymers or non-polymeric small molecules.

In some embodiments, the absorbent fluid can include an organosilicon fluid, a glycol, or an aqueous lithium chloride solution. The absorbent fluid can include one or more organic compounds dissolved or suspended therein, wherein the compounds can be liquid, solid, or gas (e.g., in pure form at standard temperature and pressure). In some embodiments the sorbent fluid can be pre-charged with a suitable level of the first component at a level suitable for efficient operation of the absorption process or an optional desorption or regeneration process. For example, an absorbent fluid for removing water vapor may contain some water at the outset, with the water concentration increasing as the absorption process is performed.

In various embodiments, the organosilicon fluid can include an organosilicon (e.g., an organopolysiloxane or other organosilicon) having at least of a hydroxy group, an ether group, an acrylate group, a methacrylate group, an acrylamide group, a methacrylamide group, and a polyether group; in some embodiments, the group can be silicon-bonded, such as to a terminal or non-terminal silicon atom. For example, the organosilicon can include a silicon-bonded ether (bonded via an alkyl group or via an oxygen-atom), a silicon-bonded polyether (e.g., a homo or heteropolyether bonded via an alkyl group or an oxygen-atom), a silicon-bonded acrylamide or methacrylamide group (e.g., bonded via an alkyl group or via a nitrogen-atom), or a silicon-bonded acrylate or methacrylate group (e.g., bonded via an alkyl group or via a nitrogen-atom). The absorbent organosilicon fluid can include an amount of an organosilicon having at least of a hydroxy group, an ether group, an acrylate group, a methacrylate group, an acrylamide group, a methacrylamide group, and a polyether group such that the organosilicon fluid can absorb at least some of the first component, such as about 0.1 wt % or less, or about 1 wt %, 2, 3, 4, 5, 10, 20, 30, 40, 50, 60, 70, 80, 90, 95, 96, 97, 98, 99 wt %, or about 99.9 wt % or more, such as about 1-99.9999 wt %, 1-40 wt %, 1-20 wt %, 1-10 wt %, 40-99.999 wt %, or about 50-99.99 wt %. In some examples, an organosilicon including at least one hydroxy group can be a hydroxydiorganosilyl-terminated polydiorganosiloxane, such as a hydroxyldimethylsilyl-terminated polydimethylsiloxane, a hydroxylmethylvinylsilyl-terminated polymethylvinylsiloxane, a hydroxyl-terminated polymethylvinylsiloxane-polydimethylsiloxane random copolymer, a hydroxydiorganosilyl-terminated polyalkyl(haloalkyl)siloxane, a hydroxylmethyl(trifluoromethylethyl)silyl-terminated polymethyl(trifluoromethylethyl)siloxane, a hydroxyl-terminated polydimethylsiloxane oligomer diol, or a hydroxyl-terminated oligomeric trifluoropropyl methylsiloxane. In various embodiments, an organosilicon having at least one ether or polyether group can be a hydroxy-terminated 3-(3-hydroxypropyl)-heptamethyltrisiloxane which has been ethoxylated (e.g., poly(ethylene oxide) substituted at one or more hydroxy groups, or a hydroxyl-terminated heptamethyl-3-(propyl(poly(ethylene oxide)) trisiloxane), an acetoxy-terminated heptamethyl-3-(propyl (poly(ethylene oxide)) trisiloxane, and blends of such organopolysiloxanes having at least one ether or polyether group with hydroxyl-terminated polydimethylsiloxane oligomer diols and capped polyethers.

An organosilicon compound can contain an average of about 0.001 mole % to about 100 mole % of a silicon-bonded group that is at least one of at least one of a hydroxy group, an ether group, an acrylate group, a methacrylate group, an acrylamide group, a methacrylamide group, and a polyether group, and any range of mole % therebetween, such as about 0.001 mole % or less, or about 0.01, 0.1, 0.5, 1, 2, 3, 4, 5, 6, 8, 10, 12, 14, 16, 18, 20, 25, 30, 40, 50, 60, 70, 80, 90, 95, 96, 97, 98, 99, or about 99.9 mole % or more. In an organopolysiloxane, the mole percent of silicon-bonded functional groups is the ratio of the number of moles of siloxane units in the organopolysiloxane having the silicon-bonded group to the total number of moles of siloxane units in the organopolysiloxane, multiplied by 100.

In some embodiments, the absorbent fluid can include a silicone fluid; in some embodiments, the absorbent fluid can be a silicon fluid. As used herein, a silicone fluid is any fluid that includes at least one organopolysiloxane. The silicone fluid can include any one or more components in addition to the at least one organopolysiloxane, for example, any suitable solvent, a silane (e.g., an organosilane), a polysilane (e.g., an organopolysilane), or suitable components that do not include silicon. In some embodiments, the silicone fluid can include any absorbent fluid as described herein. In other embodiments, the silicone fluid includes predominantly one or more organopolysiloxanes. In various embodiments, the silicone fluid can include 0.1 wt % or less organopolysiloxane, or 1 wt %, 2, 3, 4, 5, 10, 20, 30, 40, 50, 60, 70, 80, 90, 95, 96, 97, 97, 98, 99, or about 99.9 wt % or more organopolysiloxane. In some embodiments, the silicone fluid can include about 1-99.9999 wt %, 40-99.999 wt %, or about 60-99.99 wt % organopolysiloxane.

The organopolysiloxane compound can be any suitable organopolysilxoane compound. The structure of the organosilicon compound can be linear, branched, cyclic, or resinous. The organopolysiloxane compound can be a homopolymer or a copolymer. The organopolysiloxane compound can be a disiloxane, trisiloxane, or polysiloxane.

In one embodiment, the organopolysiloxane compound can include a compound of the formula

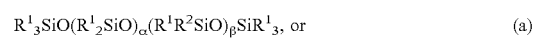  (a)

  (b)

In formula (a), α has an average value of about 0 to about 2000, and β has an average value of about 2 to about 2000. Each $R^1$ is independently a monovalent functional group. Suitable monovalent functional groups include, but are not limited to, acrylic groups; alkyl; halogenated hydrocarbon groups; alkenyl; alkynyl; aryl; and cyanoalkyl. Each $R^2$ is independently at each occurrence a hydroxy group, an ether group, an acrylate group, a methacrylate group, an acrylamide group, a methacrylamide group, a polyether group, a $(C_{1-10})$alkyl group having at least one of a hydroxy group, an ether group, an acrylate group, a methacrylate group, an acrylamide group, a methacrylamide group, and a polyether group substituted thereon, or $R^1$. In some embodiments, each $R^2$ is independently at each occurrence a hydroxy group, an ether group, an acrylate group, a methacrylate group, an acrylamide group, a methacrylamide group, or a polyether group. As used herein, an ether group can be any $(C_{1-10}$hydrocarbyl)-O-group, such as a $(C_{1-10}$alkyl)-O-group, such as a methoxy, ethoxymethyl, or propoxy. As used herein, a polyether group can be any $((C_{1-10}$hydrocarbyl)-O)_n—$, wherein each $C_{1-10}$ hydrocarbyl is independently selected at each occurrence or is the same, wherein n can be about 2 to about 10,000, 2-1000, 2-100, 2-50, or about 2-10, such as a poly($C_{1-10}$alkylene oxide), such as a poly(methylene oxide), poly(ethylene oxide), poly(propylene oxide), or poly(butylene oxide).

In formula (b), χ has an average value of 0 to 2000, and δ has an average value of 0 to 2000. Each $R^3$ is independently a monovalent functional group. Suitable monovalent functional groups include, but are not limited to, acrylic groups; alkyl; halogenated hydrocarbon groups; alkenyl; alkynyl; aryl; and cyanoalkyl. Each $R^4$ is independently at each occurrence a hydroxy group, an ether group, an acrylate group, a methacrylate group, an acrylamide group, a methacrylamide group, a polyether group, an $(C_{1-10})$alkyl group having at least one of a hydroxy group, an ether group, an acrylate group, a methacrylate group, an acrylamide group, a methacrylamide group, and a polyether group substituted thereon, or $R^3$. In some examples, each $R^4$ is independently at each occurrence a hydroxy group, a hydroxy group, an ether group, an acrylate group, a methacrylate group, an acrylamide group, a methacrylamide group, a polyether group, or $R^3$.

Examples of organopolysiloxanes can include compounds having the average unit formula

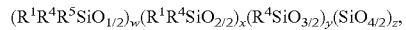

$(R^1R^4R^5SiO_{1/2})_w(R^1R^4SiO_{2/2})_x(R^4SiO_{3/2})_y(SiO_{4/2})_z,$ wherein $R^1$ is a functional group independently selected from any optionally further substituted $C_{1-15}$ functional group, including $C_{1-15}$ monovalent aliphatic hydrocarbon groups, $C_{4-15}$ monovalent aromatic hydrocarbon groups, $R^4$ is independently at each occurrence a hydroxy group, an ether group, an acrylate group, a methacrylate group, an acrylamide group, a methacrylamide group, a polyether group, a $(C_{1-10})$alkyl group having at least one of a hydroxy group, an ether group, an acrylate group, a methacrylate group, an acrylamide group, a methacrylamide group, and a polyether group substituted thereon, $R^5$, or $R^1$, $R^5$ is $R^1$ or $R^4$, $0 \le w < 0.95$, $0 \le x < 1$, $0 \le y < 1$, $0 \le z < 0.95$, and $w+x+y+z \approx 1$. In some examples, $R^4$ is independently at each occurrence a hydroxy group, an ether group, an acrylate group, a methacrylate group, an acrylamide group, a methacrylamide group, a polyether group, $R^5$, or $R^1$. In some embodiments, $R^1$ is $C_{1-10}$ hydrocarbyl or $C_{1-10}$ halogen-substituted hydrocarbyl, both free of aliphatic unsaturation, or $C_4$ to $C_{14}$ aryl. In some embodiments, w is from 0.01 to 0.6, x is from 0 to 0.5, y is from 0 to 0.95, z is from 0 to 0.4, and $w+x+y+z \approx 1$.

In some embodiments, the organopolysiloxane can include only siloxy-repeating units (e.g., can be non-copolymeric). In other embodiments, the organopolysiloxane can be a copolymer that includes at least one other repeating unit in addition to siloxy-repeating units. In some examples, the other repeating unit in the copolymer can be formed by a water-compatible organic polymer, an alcohol-compatible organic polymer, or any combination thereof. In some examples, the copolymer can be formed by polymerization of a suitable organopolysiloxane and a suitable organic polymer, wherein each of the organopolysiloxane and the organic polymer can have any suitable length; in some embodiments, the organopolysiloxane starting material or the organic polymer can be oligomeric. The polymer or copolymer can have any suitable architecture, for example, random, alternating, diblock, triblock, multi-block, graft, gradient, comb, rake, and the like. In some examples, the non-siloxy repeating units of an organopolysiloxane copolymer can be formed by copolymerization with gelatin, methylcellulose, hydroxyethyl methyl cellulose, hydroxypropyl methyl cellulose, polyethylene oxide, polyacrylamides, poly(n-isopropylacrylamide), poly(N,N-dimethyl acrylamide), polyacrylic acid, polymethacrylic acid, salts of polyacrylic acid, salts of polymethacrylic acid, poly(2-hydroxyethyl methacrylate), polylactic acid, polyglycolic acid, polyvinylalcohol, polyanhydrides such as poly(methacrylic) anhydride, poly(acrylic) anhydride, polysebacic anhydride, collagen, poly(hyaluronic acid), hyaluronic acid-containing polymers and copolymers, polypeptides, sugars such as maltose, dextrose, glucose, xylitol, and saccharin, disaccharides, polysaccharides, dextran, dextran sulfate, chitosan, chitin, agarose gels, fibrin gels, soy-derived hydrogels and alginate-based hydrogels such as poly(sodium alginate), and any combination thereof; in some embodiments, the organosilicon sorbent fluid can include a non-copolymeric organopolysiloxane in a compatibilized mixture with any one or more of these polymers or with a suitable non-polymeric small molecule. In some embodiments, the organosilicon sorbent fluid is an organopolysiloxane functionalized by grafting a water compatible non-polymeric organic molecule such as glycerol or alkylether derivatives thereon.

Regeneration/Desorption

In various embodiments, the method can include regenerating or desorbing at least part of the used absorbent fluid, such as a used organosilicon fluid. The regeneration can be any suitable regeneration such that at least some of the first component that the absorbent fluid absorbed from the feed composition is removed from the used absorbent fluid. In some embodiments, regenerating or desorption can include removing about 0.1 wt % or less of the first component from the absorbent fluid, or 1 wt %, 2 wt %, 3 wt %, 4 wt %, 5 wt %, 10 wt %, 20 wt %, 30 wt %, 40 wt %, 50 wt %, 60 wt %, 70 wt %, 80 wt %, 90 wt %, 95 wt %, 96 wt %, 97 wt %, 97 wt %, 98 wt %, 99 wt %, or about 99.9 wt % or more of the first component from the absorbent fluid, to provide the regenerated or desorbed absorbent fluid.

In various embodiments, the present invention provides a method of desorbing one or more components from an absorbent fluid. The method includes desorbing at least some of a first component from an absorbent fluid including the first component. The absorbent fluid includes an organosilicon fluid. The organosilicon fluid includes an organosilicon. The organosilicon includes at least one of a hydroxy group, an ether group, an acrylate group, a methacrylate group, an acrylamide group, a methacrylamide group, and a polyether group. The method provides a desorbed absorbent fluid and the first component that was desorbed from the absorbent fluid. The desorption can be any suitable desorption such that at least some of a first component in the absorbent fluid is desorbed, wherein the first component can be in the absorbent fluid originally via any means, such as via contacting with the feed composition, via contacting with a composition that includes predominantly the first component (e.g., can be absorbed from a mixture that is substantially pure first component, such as carbon dioxide or another gas), or via synthesis of other handling of the absorbent fluid in the presence of the first component. The desorbed first component can be used in any suitable fashion. In some embodiments, the desorption can occur into a liquid; for example, in some embodiments, a gas such as carbon dioxide can be desorbed into a liquid such as water to form, for example, carbonated water.

The regeneration or desorption of the absorbent fluid can be carried out in any suitable fashion. For example, the absorbent fluid can be regenerated by heating, such as heating to about 30° C., 50, 75, 100, 125, 150, 175, 200, 225, 250, 275, 300, 325, 350, 375, or about 400° C. or more. In some embodiments, the absorbent fluid can be heated to about 30-500° C., 30-300° C., 40-400° C., or about 50-300° C. In some examples, the absorbent fluid can be regenerated by application of a vacuum, such as about 0.000,000.1 atm or less, or about 0.000.001 atm, 0.000.01, 0.000.1, 0.001, 0.01, 0.1, or about 0.5 atm or more. In some embodiments, the absorbent fluid can be subjected to a vacuum of about 0.000,000.1 atm-0.5 atm, or about 0.000.1 atm-0.5 atm. The regeneration can include the application of heat and vacuum, heat without vacuum, vacuum without heat, or neither heat nor vacuum. In some embodiments, the absorbent fluid can desorbed or regenerated by contacting the absorbent fluid with a composition that can absorb the first component, such as a sweep fluid (e.g., liquid or gas) that has a lower partial pressure of the first component than the incoming absorbent fluid. In some embodiments, the absorbent fluid can desorbed or regenerated without application of heat or vacuum, such as via contacting the absorbent fluid on one side of a suitable membrane while contacting the other side with a composition that can absorb the first component. In some embodiments, the absorbent fluid can be desorbed or regenerated with any suitable combination of heat, vacuum and sweep fluids.

In some embodiments, the regenerated absorbent fluid can be used in the method to supplement or replace the absorbent fluid; e.g., the method can include using the regenerated absorbent fluid as at least a part of the absorbent fluid in the method. In some embodiments, the absorbent fluid can be regenerated and reused 1, 2, 3, 4, 5, 10, 20, 50, 100, or 1000 or more times.

In various examples, the heat for regeneration can be at least in part provided directly or indirectly by at least one of steam, natural gas, liquid water, heat transfer fluid, condenser heat, and air in any appropriate heat/mass exchange device or equipment.

System

In some embodiments, the present invention provides a system that can be used to perform at least one embodiment of the method of the present invention. In various embodiments, the system can be any system suitable for performing any one or more embodiments of the method described herein.

In some embodiments, the present invention provides a system for separating one or more components from a composition. The system can include a feed composition including a first component. The system can include an absorbent fluid. The system can include a contactor that contacts at least some of the first component with the absorbent fluid. The system can include a contacted composition provided by the contactor. The system can also include a used absorbent fluid provided by the contactor, the used absorbent fluid including at least some of the first component that the contactor contacted with the absorbent fluid.

In some embodiments, the contactor includes a membrane, wherein the contacting of the first component and the absorbent fluid includes contacting a first side of the membrane with the feed composition while contacting the second side of the membrane with the absorbent fluid to produce a permeate mixture on the second side of the membrane including the used absorbent fluid and a retentate mixture on the first side of the membrane including the contacted composition.

In some embodiments the contactor contacts the feed composition with the absorbent fluid. In some embodiments, the contactor includes a packed bed column or tower, a trayed tower column or tower, a falling film device, a distillation column or tower, a liquid spray column or tower, a rotating desiccant wheel or tray, a falling film device, or any combination thereof. A contactor or a membrane module can include one or more surfaces to facilitate heat transfer, such as in a liquid desiccant air conditioner.

In some embodiments, the system includes a regenerator or desorber that removes at least some of the first component from the used absorbent fluid, to provide a regenerated absorbent fluid. The absorbent fluid can include at least some of the regenerated absorbent fluid. The absorbent fluid can include an organosilicon fluid. The absorbent fluid can include an organosilicon including at least one of a hydroxy group, an ether group, an acrylate group, a methacrylate group, an acrylamide group, a methacrylamide group, and a polyether group.

A contactor, a membrane module, a regenerator, or a desorber can include one or more surfaces to facilitate heat transfer, such as in a liquid desiccant air conditioner.

In various embodiments, the present invention provides a system for desorbing one or more components from an absorbent fluid. The system includes an absorbent fluid. The absorbent fluid includes an organosilicon fluid including an organosilicon including at least one of a hydroxy group, an ether group, an acrylate group, a methacrylate group, an acrylamide group, a methacrylamide group, and a polyether group. The absorbent fluid includes a first component. The system includes a desorber that desorbs at least some of the first component from the absorbent fluid. The system includes a desorbed absorbent fluid provided by the desorber. The system also includes a first component that was desorbed from the absorbent fluid.

Apparatus

In some embodiments, the present invention provides an apparatus that can be used to perform at least one embodiment of the method of the present invention. In various embodiments, the apparatus can be any apparatus suitable for performing any one or more embodiments of the method described herein. In some embodiments, the present invention provides a separation apparatus that includes a contactor that contacts at least some of a first component in a feed composition that includes the first component with an absorbent fluid to provide a contacted composition depleted in the first component and a used absorbent fluid including at least some of the first component that the contactor contacted with the absorbent fluid. In some embodiments, the apparatus includes one or more surfaces to facilitate heat transfer.

The contactor can include a membrane. The contacting of the first component and the absorbent fluid can include contacting a first side of the membrane with the feed composition while contacting the second side of the membrane with the absorbent fluid. The contacting produces a permeate mixture on the second side of the membrane, wherein the permeate mixture includes the used absorbent fluid, and a retentate mixture on the first side of the membrane, wherein the retentate mixture includes the contacted composition. In some embodiments, the contactor contacts the feed composition with the absorbent fluid. The contactor can include a packed bed column or tower, a trayed tower column or tower, a distillation column or tower, a liquid spray column or tower, a rotating desiccant wheel or tray, a falling film device, or any combination thereof.

In some embodiments, the apparatus can include a regenerator that removes at least some of the first component from the used absorbent fluid, to provide a regenerated absorbent fluid. In some embodiments, the absorbent fluid can include at least some of the regenerated absorbent fluid.

In various embodiments, the present invention provides a desorption apparatus. The desorption apparatus includes a desorber. The desorber desorbs at least some of a first component in an absorbent fluid. The absorbent fluid includes an organosilicon fluid including an organosilicon including at least one of a hydroxy group, an ether group, an acrylate group, a methacrylate group, an acrylamide group, a methacrylamide group, and a polyether group. The absorbent fluid includes the first component. The desorbing provides a desorbed absorbent fluid and a first component that was desorbed from the absorbent fluid.

The following examples illustrate some embodiments.

Comparative Example 1. Water Vapor Absorption and Desorption

A gas/vapor mixture of nitrogen and water vapor at 23° C. and 60% relative humidity (RH) was bubbled into triethylene glycol (TEG) at 20° C. at a flow rate of 120 sccm at 1.01 atm pressure. By gravimetric analysis, 9.14 g of water vapor absorbed in TEG after 128 h. Nitrogen at 23° C. and 0% RH was then bubbled in the TEG/water vapor mixture to desorb water vapor from the TEG/water vapor mixture. The initial desorption rate constant of water vapor from TEG was $1.75\times10^{-3}$ g water vapor desorbed/hr/g water vapor in solution.

Comparative Example 2. Water Vapor Absorption

Literature data for a water vapor/TEG system at 20° C. and 1 atm indicates $8.6\times16^{-6}$ mol $H_2O$/Pa·g of TEG absorbed in TEG when the ratio moles $H_2O$ absorbed/(moles $H_2O$ absorbed+moles TEG) was between 0 and 0.05. Literature data for a water vapor/TEG system at 30° C. and 1 atm indicates $4.2\times16^{-6}$ mol $H_2O$/Pa·g of TEG absorbed in TEG when the ratio moles $H_2O$ absorbed/(moles $H_2O$ absorbed+moles TEG) was between 0 and 0.05. The percent decrease in the mol $H_2O$/Pa·g of TEG absorbed in TEG when the ratio moles $H_2O$ absorbed/(moles $H_2O$ absorbed+moles TEG) was between 0 and 0.05 upon a temperature increase from 20° C. to 30° C. was 51%. The literature data were extracted from "Methylene Glycol", February, 2007, The Dow Chemical Company.

Comparative Example 3. Water Vapor Absorption

Literature data for a water vapor/propylene glycol (PG) system at 20° C. and 1 atm indicates $8.7\times10^{-6}$ mol $H_2O$/Pa·g of PG absorbed in PG when the ratio moles $H_2O$ absorbed/(moles $H_2O$ absorbed+moles PG) was between 0 and 0.05. Literature data for a water vapor/PG system at 30° C. and 1 atm indicates $4.4\times10^{-6}$ mol $H_2O$/Pa·g of PG absorbed in PG when the ratio moles $H_2O$ absorbed/(moles $H_2O$ absorbed+moles PG) was between 0 and 0.05. The percent decrease in the mol $H_2O$/Pa·g of PG absorbed in PG when the ratio moles $H_2O$ absorbed/(moles $H_2O$ absorbed+moles PG) was between 0 and 0.05 upon a temperature increase from 20° C. to 30° C. was 49%. The literature data were extracted from "A Guide to Glycols", 2003, The Dow Chemical Company.

Comparative Example 4. Water Vapor Absorption

Literature data for a water vapor/dipropylene glycol (DPG) system at 20° C. and 1 atm indicates $4.0\times10^{-6}$ mol $H_2O$/Pa·g of DPG absorbed in DPG when the ratio moles $H_2O$ absorbed/(moles $H_2O$ absorbed+moles DPG) was between 0 and 0.05. Literature data for a water vapor/DPG system at 30° C. and 1 atm indicates $2.3\times10^{-6}$ mol $H_2O$/Pa·g of DPG absorbed in DPG when the ratio moles $H_2O$ absorbed/(moles $H_2O$ absorbed+moles DPG) was between 0 and 0.05. The percent decrease in the mol $H_2O$/Pa·g of DPG absorbed in DPG when the ratio moles $H_2O$ absorbed/(moles $H_2O$ absorbed+moles DPG) was between 0 and 0.05 upon a temperature increase from 20° C. to 30° C. was 43%. The literature data were extracted from "A Guide to Glycols", 2003, The Dow Chemical Company.

Comparative Example 5. Water Vapor Absorption

Literature data for a water vapor/aqueous lithium chloride (LiCl) system at 20° C. and 1 atm indicates $1.9\times10^{-4}$ mol $H_2O$/Pa·g of LiCl absorbed in LiCl when the ratio moles $H_2O$ absorbed/(moles $H_2O$ absorbed+moles LiCl) was between 0 and 0.05. Literature data for a water vapor/LiCl system at 30° C. and 1 atm indicates $1.0\times10^{-4}$ mol $H_2O$/Pa·g of LiCl absorbed in LiCl when the ratio moles $H_2O$ absorbed/(moles $H_2O$ absorbed+moles LiCl) was between 0 and 0.05. The percent decrease in the mol $H_2O$/Pa·g of LiCl absorbed in LiCl when the ratio moles $H_2O$ absorbed/(moles $H_2O$ absorbed+moles LiCl) was between 0 and 0.05 upon a temperature increase from 20° C. to 30° C. was 47%. The literature data were extracted from "Aqueous Solutions of Lithium and Calcium Chlorides:—Property Formulations for Use in Air Conditioning Equipment and Design", 2003, M. Conde Engineering, Zurich 2009.

Example 1. Water Vapor Absorption And Desorption

A gas/vapor mixture of nitrogen and water vapor at 23° C. and 60% RH was bubbled at a flow rate of 120 sccm at 1.01 atm pressure in a hydroxyl-terminated polydimethylsiloxane oligomer diol having a zero shear kinematic viscosity of about 40 cSt at 25° C. (Absorbent Fluid 1), at 20° C. By gravimetric analysis, 0.55 g of water vapor absorbed in the fluid after 23 h. Nitrogen at 23° C. and 0% RH was then bubbled in the fluid/water vapor mixture to desorb water vapor from the fluid/water vapor mixture. The initial desorption rate constant of water vapor from the fluid was $1.82\times10^{-2}$ g water vapor desorbed/hr/g water vapor in solution. The interfacial area for mass transfer of water vapor to and from Absorbent Fluid 1 was comparable to the interfacial area for mass transfer of water vapor to and from TEG in Comparative Example 1.

Example 2. Water Vapor Absorption and Desorption

A gas/vapor mixture of nitrogen and water vapor at 23° C. and 60% RH was bubbled at a flow rate of 120 sccm at 1.01 atm pressure in a hydroxyl-terminated oligomeric trifluoropropyl methylsiloxane having a zero shear kinematic viscosity of about 100 cSt at 25° C., (Absorbent Fluid 2) at 20° C. By gravimetric analysis, 2.08 g of water vapor absorbed in the fluid after 79 h. Nitrogen at 23° C. and 0% RH was then bubbled in the fluid/water vapor mixture to desorb water vapor from the fluid/water vapor mixture. The initial desorption rate constant of water vapor from fluid was $3.85\times10^{-2}$ g water vapor desorbed/hr/g water vapor in solution. The interfacial area for mass transfer of water vapor to and from Absorbent Fluid 2 was comparable to the interfacial area for mass transfer of water vapor to and from Absorbent Fluid 1 in Example 1 and TEG in Comparative Example 1.

Example 3. Water Vapor Absorption

A gas/vapor mixture of nitrogen and water vapor at 23° C. and 20%, 40%, 60%, and 80% RH was bubbled at a flow rate of 120 sccm at 1.01 atm pressure in Absorbent Fluid 1 at 20° C. until steady states were reached. By gravimetric analysis at steady state conditions, $4.2\times10^{-8}$ mol $H_2O$/Pa·g of Absorbent Fluid 1 absorbed in Absorbent Fluid 1 when the ratio moles $H_2O$ absorbed/(moles $H_2O$ absorbed+moles Absorbent Fluid 1) was between 0 and 0.05. A gas/vapor mixture of nitrogen and water vapor at 23° C. and 20%, 40%, 60%, and 80% RH was bubbled at a flow rate of 120 sccm at 1.01 atm pressure in Absorbent Fluid 1 at 30° C. until steady states were reached. By gravimetric analysis at steady state conditions, $3.0 \times 10^{-9}$ mol $H_2O$/Pa·g of Absorbent Fluid 1 absorbed in Absorbent Fluid 1 when the ratio moles $H_2O$ absorbed/(moles $H_2O$ absorbed+moles Absorbent Fluid 1) was between 0 and 0.05. The percent decrease in the mol $H_2O$/Pa·g of Absorbent Fluid 1 absorbed in Absorbent Fluid 1 when the ratio moles $H_2O$ absorbed/(moles $H_2O$ absorbed+moles Absorbent Fluid 1) was between 0 and 0.05 upon a temperature increase from 20° C. to 30° C. was 93%.

Example 4. Water Vapor Absorption

A gas/vapor mixture of nitrogen and water vapor at 23° C. and 20%, 40%, 60%, and 80% RH was bubbled at a flow rate of 120 sccm at 1.01 atm pressure in Absorbent Fluid 2 at 20° C. until steady states were reached. By gravimetric analysis at steady state conditions, $3.3 \times 10^{-7}$ mol $H_2O$/Pa·g of Absorbent Fluid 2 absorbed in Absorbent Fluid 2 when the ratio moles $H_2O$ absorbed/(moles $H_2O$ absorbed+moles Absorbent Fluid 2) was between 0 and 0.05. A gas/vapor mixture of nitrogen and water vapor at 23° C. and 20%, 40%, 60%, and 80% RH was bubbled at a flow rate of 120 sccm at 1.01 atm pressure in Absorbent Fluid 2 at 30° C. until steady states were reached. By gravimetric analysis at steady state conditions, $1.1 \times 10^{-7}$ mol $H_2O$/Pa·g of Absorbent Fluid 2 absorbed in Absorbent Fluid 2 when the ratio moles $H_2O$ absorbed (moles $H_2O$ absorbed+moles Absorbent Fluid 2) was between 0 and 0.05. The percent decrease in the mol $H_2O$/Pa·g of Absorbent Fluid 2 absorbed in Absorbent Fluid 2 when the ratio moles $H_2O$ absorbed/(moles $H_2O$ absorbed+moles Absorbent Fluid 2) was between 0 and 0.05 upon a temperature increase from 20° C. to 30° C. was 67%.

Example 5. Water Vapor Absorption

A gas/vapor mixture of nitrogen and water vapor at 23° C. and 20%, 40%, 60%, and 80% RH was bubbled at a flow rate of 120 sccm at 1.01 atm pressure in a silicone polyether oligomer hydroxy-terminated heptamethyl-3-(propyl(poly(ethylene oxide)) trisiloxane having a zero shear kinematic viscosity of about 60 cSt at 25° C. (Absorbent Fluid 3), at 20° C. until steady states were reached. By gravimetric analysis at steady state conditions, $1.1 \times 10^{-6}$ mol $H_2O$/Pa·g of Absorbent Fluid 3 absorbed in Absorbent Fluid 3 when the ratio moles $H_2O$ absorbed/(moles $H_2O$ absorbed+moles Absorbent Fluid 3) was between 0 and 0.05. A gas/vapor mixture of nitrogen and water vapor at 23° C. and 20%, 40%, 60%, and 80% RH was bubbled at a flow rate of 120 sccm at 1.01 atm pressure in Absorbent Fluid 3 at 30° C. until steady states were reached. By gravimetric analysis at steady state conditions, $2.8 \times 10^{-7}$ mol $H_2O$/Pa·g of Absorbent Fluid 3 absorbed in Absorbent Fluid 3 when the ratio moles $H_2O$ absorbed/(moles $H_2O$ absorbed+moles Absorbent Fluid 3) was between 0 and 0.05. The percent decrease in the mol $H_2O$/Pa·g of Absorbent Fluid 3 absorbed in Absorbent Fluid 3 when the ratio moles $H_2O$ absorbed/ (moles $H_2O$ absorbed+moles Absorbent Fluid 3) was between 0 and 0.05 upon a temperature increase from 20° C. to 30° C. was 75%.

Example 6. Water Vapor Absorption

A gas/vapor feed mixture of air and water vapor of volumetric flow rate 30 scfh at various inlet dew points entered the tube side of a membrane module including dense, unsupported silicone hollow fibers of surface area 7500 cm². Absorbent Fluid 3, and hydroxy-terminated heptamethyl-3-(propyl(poly(ethylene oxide)) trisiloxane having a zero shear kinematic viscosity of about 40 cSt at 25° C. (Absorbent Fluid 4), and acetoxy-terminated heptamethyl-3-(propyl(poly(ethylene oxide)) trisiloxane having a zero shear kinematic viscosity of about 30 cSt at 25° C. (Absorbent Fluid 5), and methoxy-terminated heptamethyl-3-(propyl(poly(ethylene oxide)) trisiloxane having a zero shear kinematic viscosity of about 30 cSt at 25° C. (Absorbent Fluid 6) were each independently pumped through the shell side of the membrane module at a flow rate of 600 cfm, contacted the membrane, and absorbed water vapor that permeates the membrane. A dried air stream exits the module as the retentate. The rate of water vapor removal in grains per hour for various inlet dew points is given in Tables 1-4 below.

TABLE 1

Absorbent Fluid 3.

| Inlet dew point (° C.) | Water vapor removal rate (grains/hr) |
|---|---|
| 14.6 | 84.7 |
| 11.7 | 67.5 |
| 8.8 | 53.2 |
| 4.3 | 36.5 |
| 0.1 | 25.2 |

TABLE 2

Absorbent Fluid 4.

| Inlet dew point (° C.) | Water vapor removal rate (grains/hr) |
|---|---|
| 13.5 | 83.1 |
| 10.9 | 66.2 |
| 8.9 | 51.9 |
| 4.1 | 32.4 |
| −0.5 | 22.3 |

TABLE 3

Absorbent Fluid 5

| Inlet dew point (° C.) | Water vapor removal rate (grains/hr) |
|---|---|
| 13.6 | 80.0 |
| 10.5 | 58.4 |
| 8.7 | 43.6 |
| 3.9 | 26.0 |
| −1.3 | 11.8 |

TABLE 4

Absorbent Fluid 6

| Inlet dew point (° C.) | Water vapor removal rate (grains/hr) |
|---|---|
| 13.9 | 72.8 |
| 11.5 | 60.0 |
| 8 | 43.5 |
| 4.3 | 31.2 |
| −1.3 | 17.6 |

Example 7. Water Vapor Absorption

A gas/vapor feed mixture of air and water vapor of volumetric flow rate 20 scfh at various inlet dew points entered the tube side of a membrane module consisting of dense, unsupported silicone hollow fibers of surface area 7500 cm². Absorbent Fluid 3, and a blend of 80 wt % Absorbent Fluid 3 and 20 wt % Absorbent Fluid 1 (Fluid Blend 1) were each independently pumped through the shell side of the membrane module at a flow rate of 600 cfm, contacted the membrane, and absorbed water vapor that permeated the membrane. A dried air stream exited the module as the retentate. The rate of water vapor removal in grains per hour for various inlet dew points is given in Table 5 below.

TABLE 5

|  | Inlet dew point (° C.) | Water vapor removal rate (grains/hr) |
|---|---|---|
| Absorbent Fluid 3 | 16.0 | 56.1 |
| Fluid Blend 1 | 17.2 | 57.1 |

Example 8. Water Vapor Absorption and Desorption

A gas/vapor feed mixture of air and water vapor of volumetric flow rate 20 scfh at various inlet dew points entered the tube side of a membrane module consisting of dense, unsupported silicone hollow fibers of surface area 7500 cm². Absorbent Fluid 3 and Fluid Blend 1 were each independently pumped through the shell side of the membrane module at a flow rate of 600 cfm, contacted the membrane, and absorbed water vapor that permeated the membrane until the fluid was saturated with water vapor. Dry air at various inlet dew points entered the tube side of a membrane module having dense, unsupported silicone hollow fibers of surface area 7500 cm². The rate of water vapor desorption from the saturated fluid to the dry air in grains per hour is given in the Table 6 below.

TABLE 6

|  | Inlet dew point (° C.) | Water vapor removal rate (grains/hr) |
|---|---|---|
| Absorbent Fluid 3 | −44.6 | 69.3 |
| Fluid Blend 1 | −60.0 | 56.3 |

Example 9. Continuous Water Vapor Absorption and Desorption Using Two Membrane Modules and a Recycled Sorbent A gas/vapor feed mixture of air and water vapor of volumetric flow rate 1 scfm at an inlet dew point of 17.9° C. entered the bore side of a membrane module, denoted Module 1, consisting of dense nonporous unsupported crosslinked silicone hollow fibers of surface area 2.1 m². Absorbent Fluid 3 was pumped through the shell side of Module 1 and cooled to 15° C. prior to entering Module 1. Absorbent Fluid 3 contacted the membrane and absorbed water vapor that permeated the membrane. A dried air stream exited Module 1 as the retentate. Absorbent Fluid 3 exiting Module 1 was heated to 35° C. prior to entering the shell side of a membrane module, denoted Module 2, consisting of dense nonporous unsupported crosslinked silicone hollow fibers of surface area 2.1 m². The flow rate of Absorbent Fluid 3 was 40 g/min. A gas/vapor mixture of air and water vapor of volumetric flow rate 0.67 scfm entered the bore side of Module 2 to regenerate Absorbent Fluid 3. The water vapor removal rate in grains/hr between the feed entering Module 1 and the retentate exiting Module 1 is shown in Table 7. The rate of water vapor desorption from Absorbent Fluid 3 in grains/hr in Module 2 is shown in Table 8.

TABLE 7

|  | Inlet dew point of air/water vapor mixture entering Module 1 (° C.) | Water vapor removal rate (grains/hr) |
|---|---|---|
| Absorbent Fluid 3 | 17.9 | 169.4 |

TABLE 8

|  | Inlet dew point of air/water vapor mixture entering Module 2 (° C.) | Water vapor removal rate (grains/hr) |
|---|---|---|
| Absorbent Fluid 3 | 11.5 | 128.1 |

Example 10. Continuous Water Vapor Absorption and Desorption Using Two Packed Bed Columns and a Recycled Sorbent A gas/vapor feed mixture of air and water vapor of volumetric flow rate 1 scfm at an inlet dew point of 19.6° C. entered the bottom of a cylindrical packed bed column, denoted Column 1, of outside diameter 4.5 inches and length 36 inches constructed of schedule 80 polyvinyl chloride. Column 1 was packed with 24 inches of ⅝ inch polypropylene Flexiring® random packing material sold by Koch-Glitsch. Absorbent Fluid 3 was pumped and cooled to 15° C. prior to entering the top of Column 1. Absorbent Fluid 3 contacted the packing material and absorbed water vapor contained in the feed mixture. A dried air stream exited Column 1 as the retentate. Absorbent Fluid 3 exiting the bottom of Column 1 was heated to 35° C. prior to entering the top of a cylindrical packed bed column, denoted Column 2, of outside diameter 4.5 inches and length 36 inches constructed of schedule 80 polyvinyl chloride. Column 2 was packed with 24 inches of ⅝ inch polypropylene Flexiring® random packing material sold by Koch-Glitsch. The flow rate of Absorbent Fluid 3 was 40 g/min. A gas/vapor mixture of air and water vapor of volumetric flow rate 0.67 scfm entered the bottom of Column 2 to regenerate Absorbent Fluid 3. The water vapor removal rate in grains/hr between the feed entering Column 1 and the retentate exiting Column 1 is included in Table 9. The rate of water vapor desorption from Absorbent Fluid 3 in grains/hr in Column 2 is included in Table 10.

TABLE 9

|  | Inlet dew point of air/water vapor mixture entering Column 1 (° C.) | Water vapor removal rate (grains/hr) |
|---|---|---|
| Absorbent Fluid 3 | 19.6 | 238.7 |

TABLE 10

|  | Inlet dew point of air/water vapor mixture entering Column 2 (° C.) | Water vapor removal rate (grains/hr) |
|---|---|---|
| Absorbent Fluid 3 | 8.6 | 188.3 |

Example 11. Water Vapor Absorption

Homogeneous liquid solutions consisting of 64 wt % Absorbent Fluid 3 and 36 wt % poly(N-isopropylacrylamide) homopolymer of number average molecular weight of approximately 65,000 g/mol (Absorbent Fluid 7) were placed into a vapor sorption analyzer instrument and subjected to air/water vapor mixtures at dew points of 6° C., 12° C., and 18° C. The temperature of Absorbent Fluid 7 and air/water vapor at each dew point were the same and ranged from 20° C. to 40° C. The equilibrium wt % concentrations of sorbed water at each condition were measured with a microbalance in the vapor sorption analyzer instrument and are listed in Table 11.

TABLE 11

| Sorbent Fluid | System Temperature (° C.) | Dew Point (° C.) | Equilibrium Concentration of Water (wt %) |
|---|---|---|---|
| Absorbent Fluid 7 | 20 | 6 | 4.8 |
| Absorbent Fluid 7 | 20 | 12 | 8.0 |
| Absorbent Fluid 7 | 20 | 18 | 21.0 |
| Absorbent Fluid 7 | 30 | 6 | 2.3 |
| Absorbent Fluid 7 | 30 | 12 | 3.5 |
| Absorbent Fluid 7 | 30 | 18 | 4.7 |
| Absorbent Fluid 7 | 40 | 6 | 1.2 |
| Absorbent Fluid 7 | 40 | 12 | 1.8 |
| Absorbent Fluid 7 | 40 | 18 | 2.7 |

Example 12. Water Vapor Absorption

Homogeneous liquid solutions consisting of 80 wt % Absorbent Fluid 3 and 20 wt % poly(N-isopropylacrylamide)/monobutyl terminated polydimethylsiloxane copolymer of number average molecular weight of approximately 300,000 g/mol (Absorbent Fluid 8) were placed into a vapor sorption analyzer instrument and subjected to air/water vapor mixtures at dew points of 6° C., 12° C., and 18° C. The temperature of Absorbent Fluid 8 and air/water vapor at each dew point were the same and ranged from 20° C. to 40° C. The equilibrium wt % concentrations of sorbed water at each condition were measured with a microbalance in the vapor sorption analyzer instrument and are listed in Table 12.

TABLE 12

| Sorbent Fluid | System Temperature (° C.) | Dew Point (° C.) | Equilibrium Concentration of Water (wt %) |
|---|---|---|---|
| Absorbent Fluid 8 | 20 | 6 | 2.7 |
| Absorbent Fluid 8 | 20 | 12 | 5.8 |
| Absorbent Fluid 8 | 20 | 18 | 21.4 |
| Absorbent Fluid 8 | 30 | 6 | 1.3 |
| Absorbent Fluid 8 | 30 | 12 | 2.1 |
| Absorbent Fluid 8 | 30 | 18 | 3.5 |
| Absorbent Fluid 8 | 40 | 6 | 0.7 |
| Absorbent Fluid 8 | 40 | 12 | 1.0 |
| Absorbent Fluid 8 | 40 | 18 | 1.6 |

Example 13. Water Vapor Absorption Using a Porous Membrane

A gas/vapor feed mixture of air and water vapor of volumetric flow rate 30 scfh at an inlet dewpoint of 14.5° C. entered the tube side of a membrane module comprising porous polypropylene hollow fibers (Membrana Liqui-cell Superphobic) of surface area 12,500 cm² (1.25 m²). Absorbent Fluid 3 was pumped through the shell side of the membrane module at a flow rate of 17 ml/min, contacted the membrane, and absorbed water vapor that permeated the membrane. A dried air stream exited the module as the retentate. The rate of water vapor removal in grains per hour for this test is given in the first full row of Table 13 below.

Example 14. Water Vapor Desorption Using a Porous Membrane

A dry air stream of volumetric flow rate 30 scfh at an inlet dewpoint of −60° C. entered the tube side of a membrane module comprising porous polypropylene hollow fibers (Membrana Liqui-cell Superphobic) of surface area 12,500 cm² (1.25 m²). A wet absorbent Fluid 3 containing 1.8 wt % A water was pumped through the shell side of the membrane module at a flow rate of 17 ml/min, contacted the membrane, and desorbed the water into the air stream. A humidified air stream exited the module as the retentate. The rate of water vapor removal in grains per hour for this test is given in the second full row of Table 13 below.

TABLE 13

| | Inlet dew point (° C.) | Water vapor removal rate (grains/hr) |
|---|---|---|
| Absorption - Example 13 | 14.5 | 83.7 |
| Desorption - Example 14 | −60.0 | 31.2 |

The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those of ordinary skill in the art, and that such modifications and variations are considered to be within the scope of this invention as defined by the appended claims.

What is claimed is:

1. A method of separating one or more components from a feed composition, the method comprising:

contacting at least some of a first component of a feed composition comprising the first component with an absorbent fluid comprising an organosilicon fluid comprising an organosilicon compound having the formula:

$$R^1{}_3SiO(R^1{}_2SiO)_\alpha(R^1R^2SiO)_\beta SiR^1{}_3, \qquad (a)$$

$$R^4R^3{}_2SiO(R^3{}_2SiO)_\chi(R^3R^4SiO)_\delta SiR^3{}_2R^4, \text{ or} \qquad (b)$$

$$(R^1R^4R^5SiO_{1/2})_w(R^1R^4SiO_{2/2})_x(R^4SiO_{3/2})_y(SiO_{4/2})_z, \qquad (c)$$

wherein,
0≤w<0.95;
0≤x<1;
0≤y<1;
0≤z<0.95;
w+x+y+z≈1;
α has an average value of 0 to 2000;
β has an average value of 2 to 2000;
χ has an average value of 0 to 2000;
δ has an average value of 0 to 2000;

each $R^1$ and $R^3$ is independently at each occurrence a monovalent acrylic group, alkyl, a halogenated hydrocarbon group, alkenyl, alkynyl, aryl, or cyanoalkyl;

each $R^2$ is independently at each occurrence a hydroxy group, an ether group, an acrylate group, a methacrylate group, an acrylamide group, a methacrylamide group, a polyether group, a $(C_{1-10})$alkyl group having at least one of a hydroxy group, an ether group, an acrylate group, a methacrylate group, an acrylamide group, a methacrylamide group, or a polyether group substituted thereon, or $R^1$;

each $R^4$ is independently at each occurrence a hydroxy group, an ether group, an acrylate group, a methacrylate group, an acrylamide group, a methacrylamide group, a polyether group, a $(C_{1-10})$alkyl group having at least one of a hydroxy group, an ether group, an acrylate group, a methacrylate group, an acrylamide group, a methacrylamide group, or a polyether group substituted thereon, or $R^3$;

$R^5$ is $R^1$ or $R^4$;

to provide a contacted composition and a used absorbent fluid comprising at least some of the first component contacted with the absorbent fluid; and wherein the organosilicon compound is:

i) combined with at least one of the following to form a mixture, and/or ii) is a copolymer with at least one of the following:

gelatin, methylcellulose, hydroxyethyl methyl cellulose, hydroxypropyl methyl cellulose, polyethylene oxide, polyacrylamides, poly(n-isopropylacrylamide), poly(N,N-dimethyl acrylamide), polyacrylic acid, polymethacrylic acid, salts of polyacrylic acid, salts of polymethacrylic acid, poly(2-hydroxyethyl methacrylate), polylactic acid, polyglycolic acid, polyvinylalcohol, polyanhydrides, collagen, poly(hyaluronic acid), hyaluronic acid-containing polymers and copolymers, polypeptides, maltose, dextrose, glucose, xylitol, saccharin, disaccharides, polysaccharides, dextran, dextran sulfate, chitosan, chitin, agarose gels, fibrin gels, soy-derived hydrogels, poly(sodium alginate), and combinations thereof.

2. The method of claim 1, wherein the feed composition comprises a second component.

3. The method of claim 1, wherein the contacting of the first component of the feed composition with the absorbent fluid comprises contacting a first side of a membrane with the feed composition while contacting a second side of the membrane with the absorbent fluid to produce a permeate mixture on the second side of the membrane comprising the used absorbent fluid and a retentate mixture on the first side of the membrane comprising the contacted composition.

4. The method of claim 1, wherein the contacting of the first component of the feed composition with the absorbent fluid comprises contacting the feed composition with the absorbent fluid.

5. The method of claim 4, wherein the contacting of the first component of the feed composition with the absorbent fluid comprises contacting in a packed bed column or tower, a trayed tower column or tower, a distillation column or tower, a liquid spray column or tower, a rotating desiccant wheel or tray, a falling film device, across a polymeric or inorganic membrane, or any combination thereof.

6. The method of claim 1, further comprising regenerating at least part of the used absorbent fluid, comprising removing at least some of the first component from the used absorbent fluid to provide a regenerated absorbent fluid.

7. The method of claim 6, further comprising using the regenerated absorbent fluid as at least a part of the absorbent fluid in the method.

8. The method of claim 1, wherein the organosilicon fluid is a silicone fluid, wherein the organosilicon compound is an organopolysiloxane compound.

9. The method of claim 1, wherein the organosilicon compound comprises at least one silicon-bonded hydroxy group, at least one silicon-bonded ether, at least one silicon-bonded polyether, or a combination thereof.

10. The method of claim 1, wherein the absorbent fluid further comprises an alcohol, a diol, a polyol, a solvent, a salt, or a combination thereof.

11. The method of claim 1, wherein the first component comprises at least one of water, carbon dioxide, and oxygen.

12. The method of claim 1, wherein the feed composition comprises nitrogen, natural gas, air, or any combination thereof.

13. A method of separating one or more components from a composition, the method comprising:

contacting a first side of a silicone membrane with a feed composition comprising a first component and a second component while contacting a second side of the membrane with an absorbent fluid, the absorbent fluid comprising an organosilicon fluid comprising an organosilicon compound having the formula:

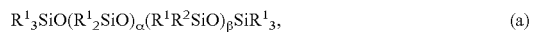 (a)

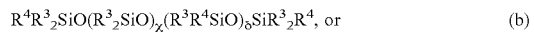 (b)

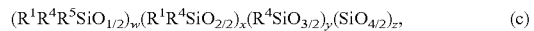 (c)

wherein, $0 \leq w < 0.95$;

$0 \leq x < 1$;

$0 \leq y < 1$;

$0 \leq z < 0.95$;

$w+x+y+z \approx 1$;

α has an average value of 0 to 2000;

β has an average value of 2 to 2000;

χ has an average value of 0 to 2000;

δ has an average value of 0 to 2000;

each $R^1$ and $R^3$ is independently at each occurrence a monovalent acrylic group, alkyl, a halogenated hydrocarbon group, alkenyl, alkynyl, aryl, or cyanoalkyl;

each $R^2$ is independently at each occurrence a hydroxy group, an ether group, an acrylate group, a methacrylate group, an acrylamide group, a methacrylamide group, a polyether group, a $(C_{1-10})$alkyl group having at least one of a hydroxy group, an ether group, an acrylate group, a methacrylate group, an acrylamide group, a methacrylamide group, or a polyether group substituted thereon, or $R^1$;

each $R^4$ is independently at each occurrence a hydroxy group, an ether group, an acrylate group, a methacrylate group, an acrylamide group, a methacrylamide group, a polyether group, a $(C_{1-10})$alkyl group having at least one of a hydroxy group, an ether group, an acrylate group, a methacrylate group, an acrylamide group, a methacrylamide group, or a polyether group substituted thereon, or $R^3$;

$R^5$ is $R^1$ or $R^4$;

to produce a permeate mixture on the second side of the membrane comprising a used absorbent fluid comprising at least some of the first component and a retentate mixture on the first side of the membrane comprising a contacted composition,
wherein the permeate mixture is enriched in the first component, and the retentate mixture is depleted in the first component and wherein the organosilicon compound is:
i) combined with at least one of the following to form a mixture, and/or
ii) is a copolymer with at least one of the following:
gelatin, methylcellulose, hydroxyethyl methyl cellulose, hydroxypropyl methyl cellulose, polyethylene oxide, polyacrylamides, poly(n-isopropylacrylamide), poly(N,N-dimethyl acrylamide), polyacrylic acid, polymethacrylic acid, salts of polyacrylic acid, salts of polymethacrylic acid, poly(2-hydroxyethyl methacrylate), polylactic acid, polyglycolic acid, polyvinylalcohol, polyanhydrides, collagen, poly(hyaluronic acid), hyaluronic acid-containing polymers and copolymers, polypeptides, maltose, dextrose, glucose, xylitol, saccharin, disaccharides, polysaccharides, dextran, dextran sulfate, chitosan, chitin, agarose gels, fibrin gels, soy-derived hydrogels, poly(sodium alginate), and combinations thereof.

14. The method of claim 13, wherein the membrane comprises at least one of a supported membrane, an unsupported membrane, a dense membrane, a porous membrane, a tubular membrane, a flat sheet membrane, and a spiral wound membrane.

15. A system for separating one or more components from a feed composition, the system comprising:
a feed composition comprising a first component;
an absorbent fluid comprising an organosilicon fluid comprising an organosilicon compound having the formula:

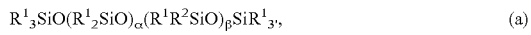  (a)

  (b)

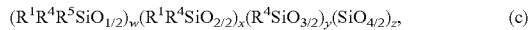  (c)

wherein,
$0 \leq w < 0.95$;
$0 \leq x < 1$;
$0 \leq y < 1$;
$0 \leq z < 0.95$;
$w+x+y+z \approx 1$;
$\alpha$ has an average value of 0 to 2000;
$\beta$ has an average value of 2 to 2000;
$\chi$ has an average value of 0 to 2000;
$\delta$ has an average value of 0 to 2000;
each $R^1$ and $R^3$ is independently at each occurrence a monovalent acrylic group, alkyl, a halogenated hydrocarbon group, alkenyl, alkynyl, aryl, or cyanoalkyl;
each $R^2$ is independently at each occurrence a hydroxy group, an ether group, an acrylate group, a methacrylate group, an acrylamide group, a methacrylamide group, a polyether group, a $(C_{1-10})$alkyl group having at least one of a hydroxy group, an ether group, an acrylate group, a methacrylate group, an acrylamide group, a methacrylamide group, or a polyether group substituted thereon, or $R^1$;
each $R^4$ is independently at each occurrence a hydroxy group, an ether group, an acrylate group, a methacrylate group, an acrylamide group, a methacrylamide group, a polyether group, a $(C_{1-10})$alkyl group having at least one of a hydroxy group, an ether group, an acrylate group, a methacrylate group, an acrylamide group, a methacrylamide group, or a polyether group substituted thereon, or $R^3$;
$R^5$ is $R^1$ or $R^4$;
a contactor that contacts at least some of the first component with the absorbent fluid;
a contacted composition provided by the contactor; and
a used absorbent fluid provided by the contactor, the used absorbent fluid comprising at least some of the first component that the contactor contacted with the absorbent fluid and wherein the organosilicon compound is:
i) combined with at least one of the following to form a mixture, and/or
ii) is a copolymer with at least one of the following:
gelatin, methylcellulose, hydroxyethyl methyl cellulose, hydroxypropyl methyl cellulose, polyethylene oxide, polyacrylamides, poly(n-isopropylacrylamide), poly(N,N-dimethyl acrylamide), polyacrylic acid, polymethacrylic acid, salts of polyacrylic acid, salts of polymethacrylic acid, poly(2-hydroxyethyl methacrylate), polylactic acid, polyglycolic acid, polyvinylalcohol, polyanhydrides, collagen, poly(hyaluronic acid), hyaluronic acid-containing polymers and copolymers, polypeptides, maltose, dextrose, glucose, xylitol, saccharin, disaccharides, polysaccharides, dextran, dextran sulfate, chitosan, chitin, agarose gels, fibrin gels, soy-derived hydrogels, poly(sodium alginate), and combinations thereof.

16. The method of claim 1, wherein the organosilicon compound has only siloxy-repeating units.

17. The method of claim 1, further comprising desorption of the first component from the absorbent fluid to form a regenerated absorbent fluid.

18. The method of claim 17, wherein the regenerated absorbent fluid is reused as at least part of the absorbent fluid.